United States Patent
Meurer

(10) Patent No.: US 7,169,312 B1
(45) Date of Patent: *Jan. 30, 2007

(54) METHODS OF AND APPARATUS FOR COLLECTING SLUDGE FROM THE FLOOR OF A SETTLER BASIN

(75) Inventor: Charles Lonnie Meurer, Golden, CO (US)

(73) Assignee: Meurer Research, Inc., Golden, CO (US)

(*) Notice: Subject to any disclaimer, the term of this patent is extended or adjusted under 35 U.S.C. 154(b) by 15 days.

This patent is subject to a terminal disclaimer.

(21) Appl. No.: 10/992,964

(22) Filed: Nov. 18, 2004

Related U.S. Application Data

(63) Continuation-in-part of application No. 10/420,570, filed on Apr. 21, 2003, now Pat. No. 6,951,620.

(51) Int. Cl.
*B01D 21/24* (2006.01)

(52) U.S. Cl. ............... 210/803; 210/527; 210/532.1

(58) Field of Classification Search ............ 210/803, 210/523, 525, 527, 532.1, 540
See application file for complete search history.

(56) References Cited

U.S. PATENT DOCUMENTS

| | | | |
|---|---|---|---|
| 630,962 A | 8/1899 | Wood | |
| 1,918,742 A | 7/1933 | Elrod | 210/525 |
| 2,646,889 A | 7/1953 | Dulak | 210/207 |
| 3,333,704 A | 8/1967 | McGivern | 210/242 |
| 3,353,683 A | 11/1967 | Geiger | 210/527 |
| 3,416,176 A | 12/1968 | Ravitts | 15/1.7 |
| 3,494,462 A | 2/1970 | Baud | 210/112 |
| 3,616,651 A | 11/1971 | Chang et al. | 405/158 |
| 3,669,271 A | 6/1972 | McGivern | 210/128 |
| 3,707,737 A | 1/1973 | Brower | 15/1.7 |
| 4,090,966 A | 5/1978 | Clendenen | 210/143 |
| 4,193,871 A | 3/1980 | White et al. | 210/525 |
| 4,401,576 A | 8/1983 | Meurer | 210/803 |
| 4,477,939 A | 10/1984 | White et al. | 15/246.5 |
| 4,514,303 A | 4/1985 | Moore | 210/519 |
| 4,551,246 A | 11/1985 | Coffing | 210/221 |
| 4,555,340 A | 11/1985 | Boyle | 210/248 |
| 5,059,312 A | 10/1991 | Galletti | 210/540 |
| 5,366,638 A | 11/1994 | Moore | 210/802 |
| 5,435,924 A | 7/1995 | Albertson | 210/803 |
| 5,552,050 A | 9/1996 | Valentin | 210/525 |
| 5,693,218 A | 12/1997 | Yamamoto et al. | 210/540 |
| 5,830,356 A | 11/1998 | Kauppila | 210/528 |
| 5,914,049 A * | 6/1999 | Brauch et al. | 210/527 |
| 6,045,709 A | 4/2000 | Roberts | 210/803 |
| 6,234,323 B1 | 5/2001 | Sarrouh | 210/523 |
| 6,497,249 B1 * | 12/2002 | Swan et al. | 210/527 |
| 6,951,620 B2 * | 10/2005 | Brauch et al. | 210/527 |

* cited by examiner

*Primary Examiner*—Christopher Upton
(74) *Attorney, Agent, or Firm*—C. E. Martine, Jr.

(57) ABSTRACT

A system meets material collection needs by significantly increasing the flow rate through a header that collects sludge. Telescopic pipes stay in a line adjacent to the bottom of a basin and do not float upwardly into or against equipment in the basin. A bearing is configured in a radial space between the pipes and with a central axial sludge collection opening, and adjacent to the header. The sludge collection opening allows sludge flow into the pipes, the flow having a value not less than a minimum flow. This flow is into system from immediately around the pipes configured in the telescopic relationship.

21 Claims, 15 Drawing Sheets

METHODS OF AND APPARATUS FOR COLLECTING SLUDGE FROM THE FLOOR OF A SETTLER BASIN

CROSS REFERENCE TO RELATED APPLICATION

This application is a continuation-in-part of co-pending application Ser. No. 10/420,570 filed Apr. 21, 2003 now U.S. Pat. No. 6,951,620 for "Apparatus For Collecting Sludge From The Floor Of A Settler Basin" (the "parent application"), priority from which parent application is claimed under 35 USC Section 120, and which parent application is incorporated by reference.

FIELD OF THE INVENTION

The present invention relates to the collection of materials from liquids, and more particularly to a telescopic pipe arrangement having a central sludge collection bearing between telescoping pipes, wherein the bearing is adjacent to the header and is configured with a central sludge inlet that is proportional to the configuration of lateral sludge inlets of the headers, and the central sludge inlets collects the sludge from locations immediately around at least one of the telescoping pipes.

BACKGROUND OF THE INVENTION

In the past, containers (e.g., basins or tanks) have been provided to house apparatus in which materials are collected. For example, materials may be collected from liquids by plate or tube settlers that promote settling of the material to the bottom of the basin. In other cases, flocculators may be housed in such containers, and materials often inadvertently move in the flocculators to the bottom of the basin. Because the flocculators are designed to circulate the liquid and materials, rather than to promote settling of the materials, the materials that inadvertently collect at the bottom of the basin present a problem. In both cases, the materials on the bottom may be referred to as sludge.

In the case of the settlers, for example, the sludge is collected, or removed, from the bottom to make room for more sludge as more liquid and materials flow into the basin and the materials settle and become sludge. In the past, sludge collection equipment has been mounted on or near the bottom for gathering the sludge and causing the sludge to flow out of the basins. Such equipment has included a so-called header pipe (e.g., a hollow tube), known as a "header", and mounted for movement along a path adjacent to the bottom. The header is below the settler plates of a settler, for example. Low pressure has been applied to the header as the header is moved along the path. Holes in the header admit the sludge and liquid from the bottom of the basin. The holes may be of the type described in U.S. Pat. No. 5,914,049, issued on Jun. 22, 1999, and entitled "Method and Apparatus For Helical Flow In Header Conduit", the disclosure of which is incorporated by reference. Under the action of the low pressure, the sludge and the liquid flow into and through the header, and from the header through a flexible outlet hose to a discharge location out of the basin.

The low pressure has been applied to the header by the flexible outlet hose. Such hoses have generally been small diameter hoses, e.g., not exceeding four inches in diameter. Also, the flexible hoses are typically ribbed on the inside, which restricts the inside diameter and increases head loss. Generally, such small diameter hoses can only induce a maximum flow rate of about 200 gallons per minute (gpm) in the header. Thus, the flow rate through the header has been limited by the flow capacity of the flexible outlet hoses.

An unacceptable solution to this flow rate problem is to use many of the flexible hoses. That solution is unacceptable because the flexible outlet hoses can flex. Each flexible hose is thus free to rise (i.e., float) above the header under buoyancy forces of gases in the flexible outlet hose. As a result, the flexible hoses have in the past risen above the header and a portion of each flexible hose has assumed an inverted U-shape. Unfortunately, because the U-shaped portion is above the level of the header, and is above the level of an outlet of the flexible hose from the basin, the gas becomes trapped in such inverted U-shaped portion, making it difficult to prime the hose when starting the sludge collecting operation. When many flexible hoses are used to provide more flow rate from the header, the priming problem is increased.

Also, because the flexible outlet hoses tend to float, these hoses tend to interfere with the operation of the settlers, which extend downwardly in the basin toward the bottom and provide a low-clearance configuration at the bottom of the basin. A similar problem would exist with attempts to use such hoses to remove the material from beneath the flocculators.

Another unacceptable solution to this flow rate problem is to provide a telescopic conduit arrangement in which a difference in diameter between an inner conduit and an outer conduit is increased to provide, on a sealing means that tightly seals the inner conduit to the outer conduit, an area subject to differential pressure to drive a sludge take-up system across a floor of a basin. Unacceptable aspects of such sealing means include a reduction in sludge flow rate through the telescopic arrangement due to pressure drop caused by the driving of the sludge take-up system. Also, the tight seal of the sealing means increases the force required to slide one conduit relative to the other conduit, and thus increases the force required to drive the sludge take-up system across a floor of a basin. In turn, this requires more pressure drop and resulting reduction in sludge flow rate through the telescopic arrangement. Further, the tight sealing means moves along a path near a longitudinal axis of the telescopic conduit arrangement and does not allow collection of the sludge from near such axis.

What is needed then is a way of allowing collection of the sludge from near the longitudinal axis of the sludge collecting system, while allowing the sludge collecting system to traverse the header from one end of a very long basin to the opposite end of the very long basin, and without decreasing the flow of the sludge from the system, so that sludge will not build-up near such axis, thus avoiding interference with traverse of the header from one end of the basin to the opposite end of the basin, for example.

SUMMARY OF THE INVENTION

Briefly, the present invention meets all of the above needs by providing a way of avoiding impairing normal material collection movement of the header. The way of avoiding impairing normal material collection movement of the header is by providing a new configuration of pipes in a telescopic relationship. In the new configuration, one telescopic pipe (an inner pipe) may be secured or fixed to the basin, as by being held in place as it extends through an end wall of the basin to a material outlet outside the basin. Such fixed inner pipe may be a larger-diameter pipe, measured relative to the small (e.g., maximum of four inches) prior flexible hoses described above. The other (or outer) telescopic pipe may be somewhat larger (e.g., about two inches larger) than the fixed inner pipe so as to receive the fixed inner pipe and permit relative movement between the two telescopic pipes. The movable outer pipe carries the header and may be traversed by a low-profile cable drive relative to the bottom of the basin and between the end walls of the basin to present the header to the material that accumulates on the bottom of the basin awaiting collection. The way of achieving these features, and while avoiding impairing the normal material collection movement of the header, is by the new configuration of the telescopic pipes in which a central axial material collection opening is configured adjacent to the header. Such configuration of the central axial material collection opening allows a flow of collected material, that flow having a value of not less than a minimum flow of collected material to flow into the material collection system from immediately around the two material collection pipes configured in the telescopic relationship. The way the present invention configures the central axial material collection opening to avoid impairing such normal material collection movement, is by configuring a bearing between the two pipes and adjacent to the header. The bearing is configured to receive the inner pipe and define the central axial material collection opening so as to allow the flow to be a central axial material flow having the value of not less than the minimum flow. The central axial flow flows directly into the two material collection pipes adjacent to the header. The configured bearing also allows such central axial flow during other material flow that is into the adjacent header. In this manner, during material collection by the header, that central axial flow is also collected from locations immediately around the two pipes, so that normal material collection traversing of the movable outer pipe is not impaired by material that, in the absence of the central axial material collection opening, would build-up centrally, i.e., immediately around the pipes that are in the telescopic relationship. Thus, a drive for the material collecting system is separated from the flow of collected material (as by providing the low-profile cable drive). Further, the outer and inner pipes are not sealed to each other. Instead, the new bearing configuration promotes the collection of the material axially through the central axial material collection opening and allows collection of the material from central locations near or immediately around the pipes of the material collecting system.

One aspect of the present invention is to provide a system for collecting material from a bottom of a material settling container, such as a settler basin. The system may include a first (or inner) rigid pipe, the first rigid pipe having a first opening, and a second (or outer) rigid pipe, the second rigid pipe having at least one open end. The first and second pipes are in telescopic relationship with one pipe received within the other pipe in an overlapping relationship so that the first and second pipes cooperate to define a central material collection conduit. A first portion of the central material collection conduit extends axially between the first opening and the at least one open end. The first portion is configured to define a radial clearance between the first rigid pipe and the second rigid pipe. A bearing is received in the radial clearance between the first pipe and the second pipe. The bearing is axially positioned between the first opening and the at least one open end, and is adjacent to a header that is mounted to the second pipe near the at least one open end. This one aspect of the present invention further includes configuring the bearing to define a central axial material collection opening, which is thus located axially between the first opening of the first pipe and the at least one open end of the second pipe. The radial configuration of the bearing is such that with the inner pipe received in the bearing the central material collection opening allows a material flow having a value of not less than a minimum flow of collected material to flow centrally and axially through the radial clearance from the at least one open end of the second pipe to the first opening of the first pipe. The allowed flow having that value is sufficient to collect the material centrally, i.e., from immediately around the pipes in the telescopic relationship, so that normal material collection traversing of the second pipe is not impaired by material that, in the absence of the central material collection opening, would build-up centrally, i.e., immediately around the pipes that are in the telescopic relationship. This allowed flow occurs as material is also collected by the adjacent header that is mounted to the second pipe.

Another aspect of the present invention is to provide a system for collecting sludge from a bottom of a basin on which the sludge settles. The system may include an inner rigid pipe, the inner pipe having a first opening. Also, there is provided an outer rigid pipe, the outer pipe having an open end. The inner and outer pipes are in a telescopic relationship to define a sludge collection conduit. A first portion of the sludge collection conduit extends axially between the first opening and the open end. The first portion is configured as a sludge passageway that extends radially between the inner pipe and the outer pipe and axially between the first opening and the open end. A header is secured to the outer pipe adjacent to the open end. The header is configured with a first plurality of openings through which to collect the sludge from across a width of the basin, except from a central axial location immediately around the inner and outer pipes. The header defines a header conduit extending from the first plurality of openings laterally to the sludge collection conduit. A bearing is received in the sludge passageway radially between the inner pipe and the outer pipe, and adjacent to both the open end and the header. The configuration of the bearing promotes normal sludge collection movement of the outer pipe relative to the inner pipe, which movement may be into sludge that is to be collected. In this other aspect of the present invention the bearing is also configured to receive the inner pipe and define a central axial sludge collection opening at an axial location between the first opening of the inner pipe and the open end of the outer pipe. The central axial sludge collection opening allows a central axial flow of collected sludge to occur from the open end and axially through the sludge passageway to the outer pipe. Significantly, in the new configuration of the pipes with the bearing, a first area of the central axial sludge collection opening is related to a second area. The second area comprises a total of individual areas of all of the first plurality of openings of the adjacent header. The first area is proportional to the second area plus the first area, as defined for example by an area ratio that is about 1 to 8 to allow the central axial flow to have a value not less than the minimum flow. This central axial flow having that value is sufficient to collect enough sludge from the central location immediately around the inner and outer pipes in the telescopic relationship, so that the normal sludge collection movement of the outer pipe is not impaired by sludge that, in the absence of the central axial sludge collection opening, would build-up centrally on the bottom and centrally immediately around the inner and outer pipes in the telescopic relationship.

A still further aspect of the present invention is a method of collecting sludge from a settling volume, which volume may be a settler basin or a pond. The method may include an operation of mounting inner and outer rigid pipes in a telescopic relationship, the inner pipe being received within the outer pipe in an overlapping relationship so that the pipes cooperate to define a sludge collection conduit adjacent to the bottom of the settling volume. The mounting operation may define a first opening in the inner pipe, the first opening being received inside the outer pipe. The mounting operation may also define an outlet end of the inner pipe, and an open end of the outer pipe. Another operation may configure a bearing received in the outer pipe adjacent to the open end for maintaining the sludge collection conduit in an open condition. The open condition is around the inner pipe received in the bearing, and defines a flow path extending centrally and axially from the open end to the first opening. The configuring operation promotes ease of sludge collection movement of the outer pipe relative to the inner pipe, which sludge collection movement is into the sludge that is on the bottom of the volume. The configuring operation further configures the bearing to allow a central axial flow in the flow path, that flow having a value of not less than a minimum flow of collected sludge. That central axial flow is thus through the sludge collection conduit that is in the open condition. That central axial flow having that value is sufficient to collect the sludge from immediately around the pipes that are in the telescopic relationship so that normal material collection movement of the outer pipe is not impaired by sludge that, in the absence of the central axial flow path maintained in the open condition, would build-up centrally, i.e., immediately around the pipes that are in the telescopic relationship.

Another aspect of the method of the present invention may include the further operation of attaching a header to the outer pipe adjacent to the open end at which the bearing is located. The header has a plurality of sludge inlet orifices for collecting sludge from the bottom of the volume that is immediately around the pipes in the telescopic relationship. Another operation may define the sludge collection conduit as having a selected area that is maintained in the open condition. Another operation may configure areas of the orifices so that a ratio of the selected area to a sum of the selected area and a total area of the orifices is in a ratio of about 2 to 16.

A yet other aspect of the present invention may include a further method operation of applying a lower-than atmospheric pressure to the outlet end of the inner pipe. The applying operation urges the sludge to flow into the plurality of sludge inlet orifices from those parts of the volume that are laterally away from the volume that is immediately around the pipes in the telescopic relationship. The applying operation further urges the sludge to flow centrally and axially from the volume that is immediately around the inner and outer pipes in the telescopic relationship. This central axial sludge flow is into the open end of the outer pipe and is through the sludge collection conduit that is maintained in the open condition. This central axial sludge flow has a value of not less than the minimum flow of collected sludge, so that normal material collection movement of the outer pipe is not impaired by sludge that, in the absence of maintaining the selected area in the open condition, would build-up centrally, i.e., immediately around the pipes that are in the telescopic relationship.

Other aspects and advantages of the present invention will become apparent from the following detailed descriptions, taken in conjunction with the accompanying drawings, illustrating by way of example, the principles of the present invention.

BRIEF DESCRIPTION OF THE DRAWINGS

The present invention will be readily understood by the following detailed description in conjunction with the accompanying drawings, wherein like reference numerals designate like structural elements or operations.

DETAILED DESCRIPTION OF THE PREFERRED EMBODIMENTS

An invention is described for significantly increasing the flow rate through header pipes that collect material from a header collection area across the bottom of a basin, and for providing an adequate flow rate of material into one or both ends of telescoping pipes to collect the material from a central axial telescopic pipe collection area immediately around the pipes that are in the telescopic relationship. As a result, normal material collection movement of an outer pipe is not impaired by material that, in the absence of the central collection area, would build-up centrally immediately around the pipes in the telescopic relationship. Such telescoping pipe structures provide a way of achieving more complete material collection, in a low-clearance space under the settler and flocculating equipment that extends down near the bottom of the basin. The more complete material collection includes the collection of the material from the central axial telescopic pipe collection area immediately around the pipes to facilitate normal header traversing for material collection from the header collection area.

In the following description, numerous specific details are set forth in order to provide a thorough understanding of the present invention. It will be understood, however, to one skilled in the art, that the present invention may be practiced without some or all of those details. In other instances, well known operations and structure have not been described in detail in order to not obscure the present invention.

Figure 1A:
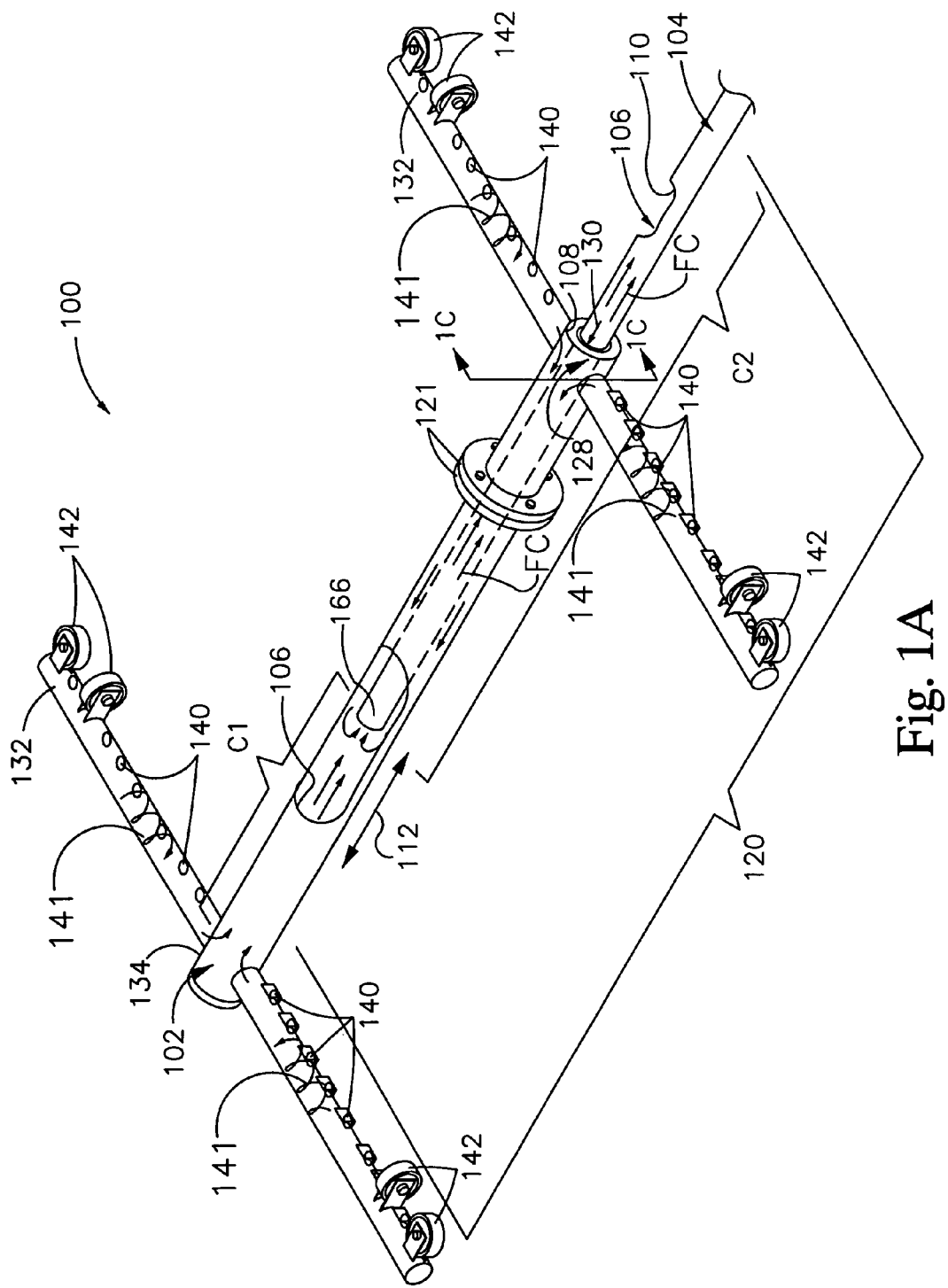
FIG. 1A is a perspective view illustrating a preferred embodiment of a system of the present invention for collecting material.

Referring now to the drawings, FIG. 1A illustrates a system 100 of the present invention for collecting material. The material may initially be in, or mixed with, a liquid, such as water or water-like fluids typically found in settlers, flocculators or other liquid treatment plants. For example, the material may be the above-referenced material collected from liquids in plate or tube settlers that promote settling of the material to the bottom of the basin. The settlers may be fabricated according to U.S. Pat. No. 5,391,306, issued Jun. 21, 1995, and entitled "Settler With Preset Outlet Area Deck and Variable Angle Removable Lamina and Method of Using Settler", in which settler plates are movable, for example, and the disclosure of such Patent is incorporated herein by this reference. Additionally, the material may inadvertently move from the flocculators to the bottom of the basin. Whether the materials are from settlers, or flocculators, or from other sources or equipment, the materials may be referred to as "sludge". Also, reference may be made below to "sludge flow", or "material flow", or to "flow of sludge" or to "flow of material", e.g., during sludge or material collection. It is to be understood that all such references to "flow" with respect to sludge may include both sludge and such liquid (e.g., water or water-like fluids) typically found in settlers, flocculators or other liquid treatment plants. Further, all such references to "flow" with respect to "material" or "flow of material" likewise may include both material and such liquid.

In the system, a first rigid pipe 102 and a second rigid pipe 104 each define a conduit 106. The pipes 102 and 104 are configured to be rigid, as compared to the above-described flexible hoses that are light and tend to bend and allow floatation, as described above. Thus, the rigid pipes 102 and 104 do not bend easily, if at all, and are not subject to the above-noted problems of the flexible hoses. For ease of description, the first rigid pipe 102 and the second rigid pipe 104 may be referred to as "pipes", without referencing the rigidity, but in each case the rigid characteristic (or property) is provided.

The second pipe 104 may be referred to as an inner pipe in that it is received partially or entirely inside the first pipe 102 in a telescopic relationship. The first pipe 102 may be referred to as the outer pipe. To provide adequate flow rate of the collected materials and liquid out of the basin, the inner pipe 104 may be configured with a nominal (inside) diameter of from 3 inches to 12 inches, for example. The outer pipe 102 may be configured with a nominal diameter that is about 2 inches greater than that of the inner pipe 104 when the inner pipe has the 3 inch nominal diameter, for example. The outer pipe 102 may be configured with a nominal diameter that is about 4 inches greater than that of the inner pipe 104 when the inner pipe has the 12 inch nominal diameter, for example. A radial, or cross-sectional, area AO is defined inside the outer pipe, and a radial, or cross-sectional, area AI is defined by the outside of the inner pipe. The larger diameter of the outer pipe 102 provides a radial clearance of about 1 to 2 inches between a wall 108 (FIG. 1C) of the outer pipe 102 and a wall 110 (FIG. 1C) of the inner pipe 104. The radial clearance has a radial, or cross-sectional, area ARC, which has a value of AO–AI. These areas AO, AI, and ARC, may be viewed in FIGS. 1B, 7 and 8, but for clarity of illustration are not identified in those Figures. According to the diameters selected for flow rate purposes, the pipes 102 and 104 may have the respective walls 108 and 110 that are thin, such as a wall thickness of about 0.083 to about 0.125 inches. Such adequate flow rate may be in a range of from about 20 gpm (corresponding to flow through the area AI of the 3 inch diameter inner pipe 104) to about 2000 gpm (corresponding to flow through the area AI of the 12 inch nominal diameter inner pipe 104 and flow through the area AO of the 16 inch nominal diameter outer pipe 102). It may thus be understood that the rigid inner pipe 104 may be sized with the area AI to provide a substantially greater flow rate than the maximum 200 gpm flow rate generally provided by the flexible hose that is subject to the priming problems described above. For clarity of description, "flow" refers herein to movement of the sludge (or material) and such liquid, and "flow rate" refers herein to a time rate of such movement, e.g., measured in gallons per minute (gpm) for example.

FIG. 1A shows that the first and second pipes 102 and 104 are in the telescopic relationship, the inner pipe 104 being received partially or fully within the outer pipe 102. The pipes 102 and 104 may be in (or close to) a coaxial relationship. The telescopic relationship is also one in which the pipes 102 and 104 are free to move in an axial direction (see FIG. 1A, arrow 112) relative to each other. The longest combined, or extended, length of the pipes (see LE in FIG. 2B) is about the sum of each separate length of each pipe 102 and 104. The length LE also corresponds to an extended position of the pipes 102 and 104. In the extended position, the outer pipe 102 overlaps the inner pipes 104 by about four to six inches, for example. The axial direction 112 of relative movement also allows the pipes 102 and 104 to move so that the inner pipe 104 may be almost fully received within the outer pipe 102, and the combined, or collapsed, length (see LC in FIG. 2A) of the pipes 102 and 104 is the value of the longer of the two pipes. The length LC also corresponds to a collapsed position of the pipes 102 and 104. In this manner, the conduits 106 of the pipes 102 and 104 cooperate to define a material collection conduit 120 that has a variable length.

The length of each separate one of the pipes 102 and 104 is generally the same, and may range from about 20 feet to about 100 feet, which length depends on factors described below. The telescopic relationship between the two pipes 102 and 104 is illustrated in FIG. 1A, which shows one part (see C1) of the material collection conduit 120 configured from the conduit 106 of the outer pipe 102 when the inner pipe 104 is only partially within the outer pipe 102.

FIG. 1A shows a second part (see C2) of the material collection conduit 120 configured from the conduit 106 of the inner pipe 104 when the inner pipe 104 is only partially within the outer pipe 102. Part C2 is shown extending partially within and then to the right of the first pipe 102 as shown in FIG. 1A. The conduit 106 of the inner pipe 104 has the lesser diameter of the two pipes 102 and 104, and must be sized to provide the desired flow rate of the material and the liquid that are collected. In a different sense, it may be understood that the approximate maximum 16 inch nominal diameter of the telescoped pipes 102 and 104 and other factors of the present invention may provide a maximum vertical dimension DM (FIG. 3A) of about two feet. This maximum vertical dimension DM is referred to as a low profile, wherein "low" designates a value less than a clearance, or height distance, H (FIG. 3A) described hereinbelow. This low profile also takes into consideration another factor, namely that the outer pipe 102 may be provided and configured as shown in FIG. 1B with an assembly of short pipes that are connected by flanges 121, for example, such that the flanges 121 are within the low profile.

Figure 1B:
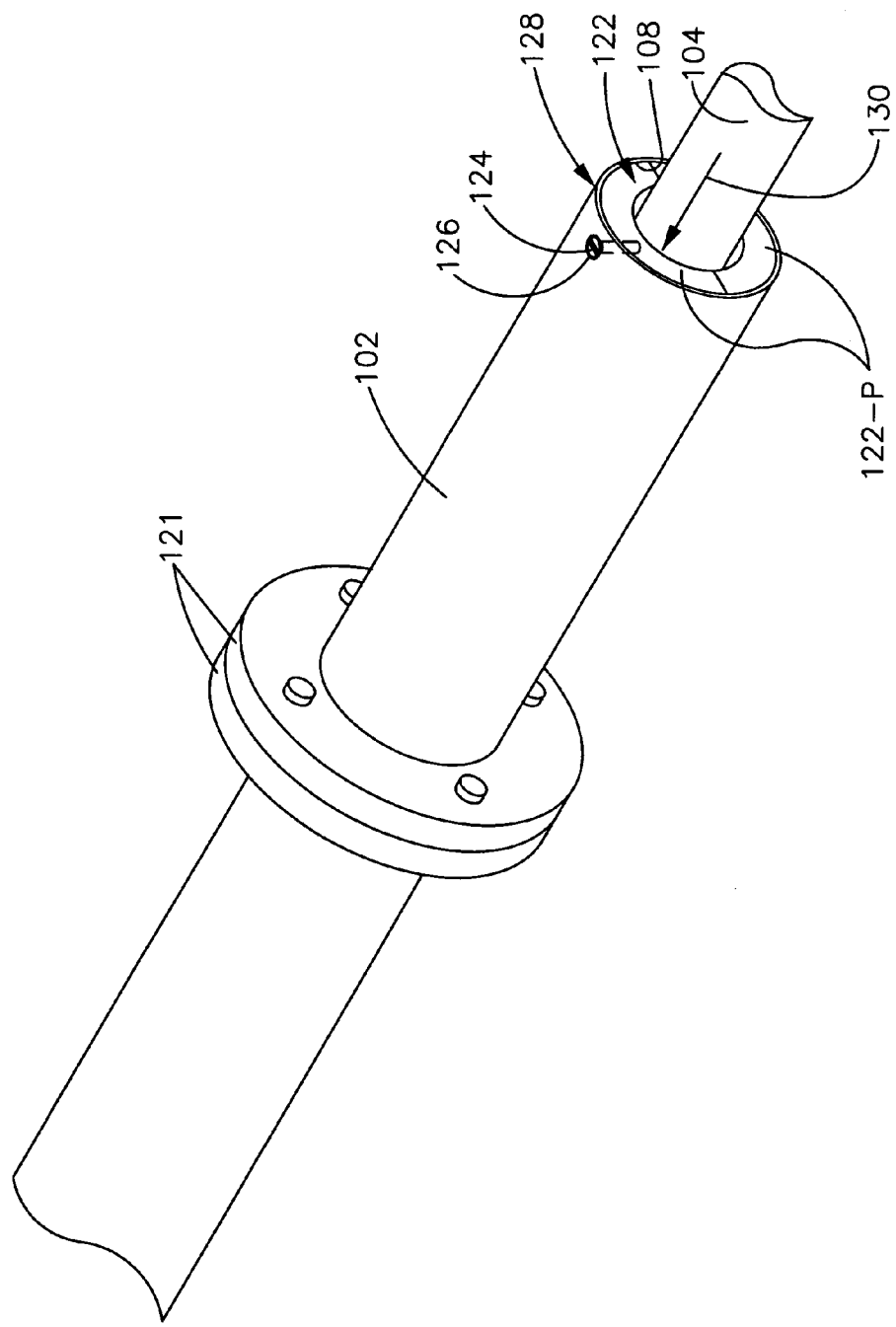
FIG. 1B is a perspective view illustrating a portion of the system shown in FIG. 1A, wherein a bearing is mounted in an open end of an outer pipe and is configured to allow a central axial flow having a value of not less than a minimum flow of sludge into the outer pipe for sludge collection centrally while sludge is also collected by an adjacent header from locations that are laterally away from the outer pipe.
Figure 1C:
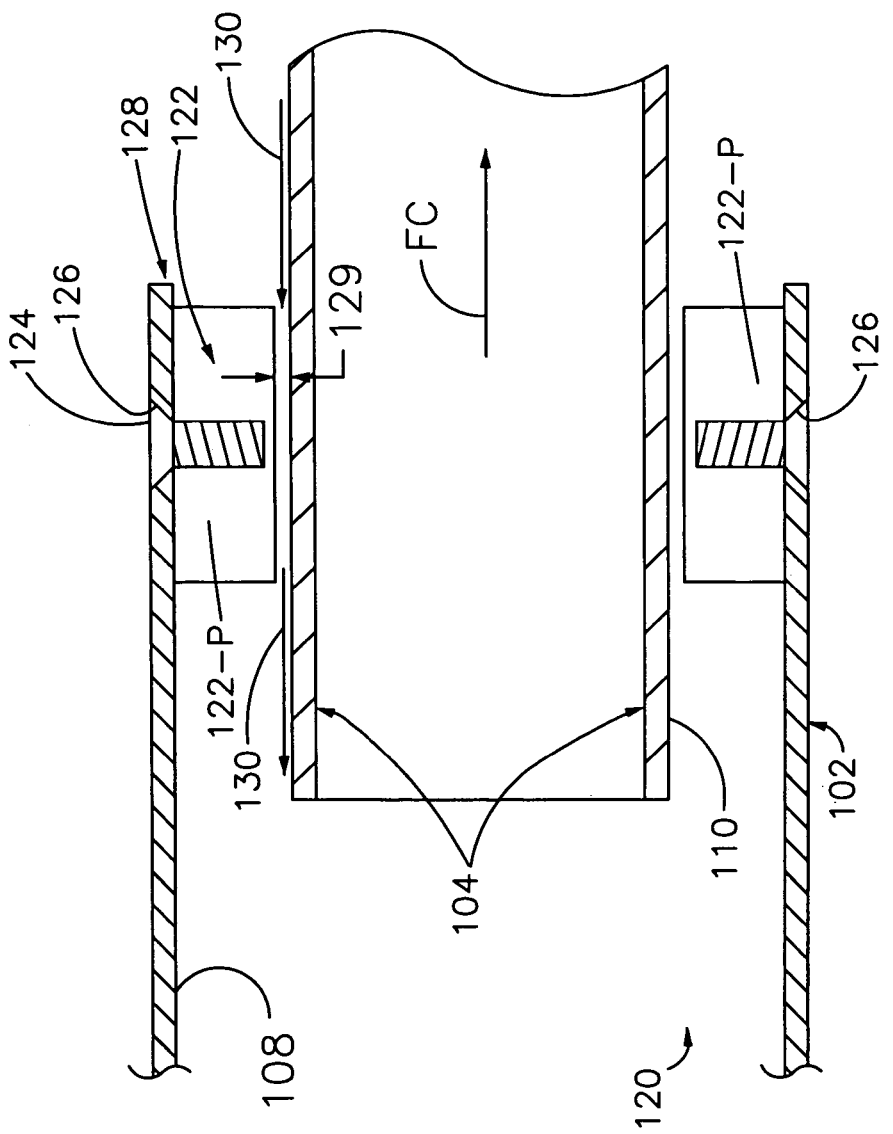
FIG. 1C is a cross sectional view taken along line 1C—1C in FIG. 1A, illustrating the bearing inside of an outer pipe and defining a central sludge collection opening allowing the central axial flow having a value of less than the minimum flow into the telescopic pipes of the system shown in FIG. 1A.
Figure 4:
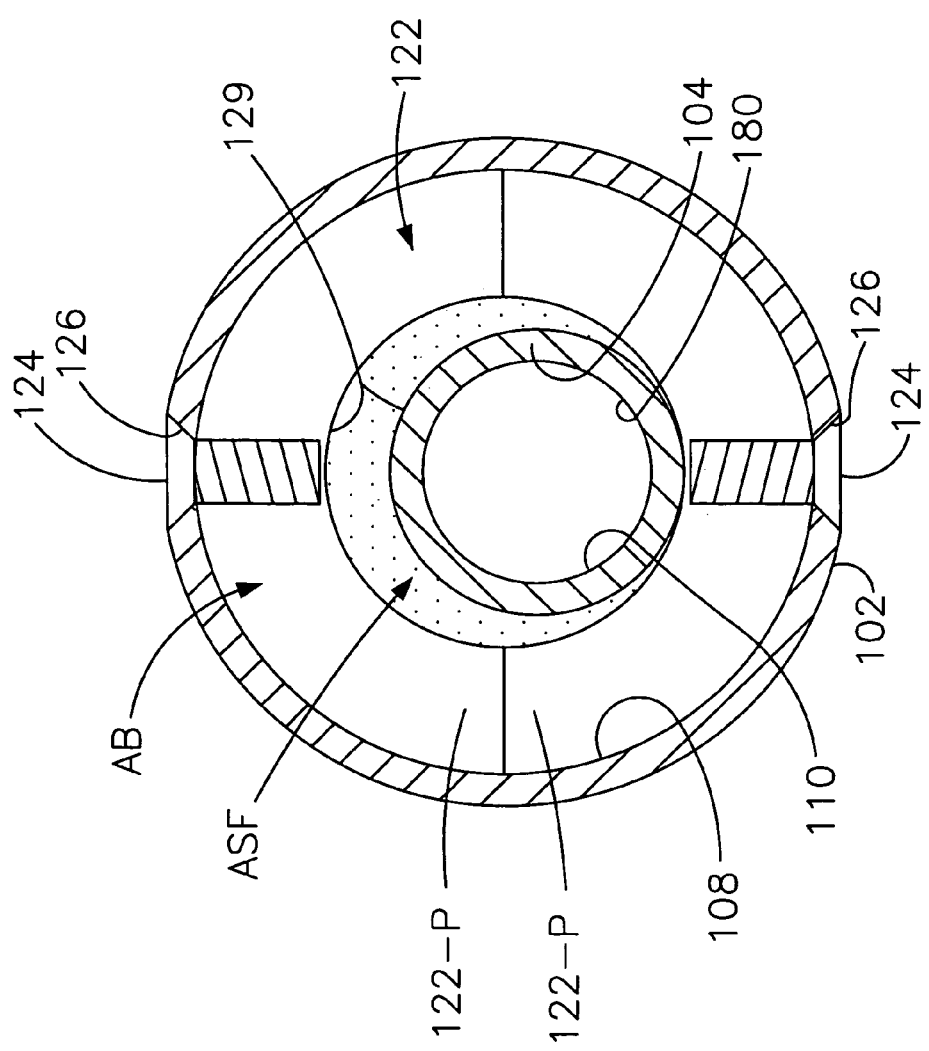
FIG. 4 is a cross sectional view taken along lines 4—4 in FIG. 2B, showing details of a fastener that secures the bearing to the outer pipe.

FIGS. 1B and 1C show the pipes 102 and 104 in the telescopic relationship, with the radial clearance between the two pipes. In FIGS. 1B, 1C, and 4, a bearing 122 is also shown received in the radial clearance between the two pipes. The bearing 122 is configured with an annular radial (or cross-sectional) area AB (FIG. 4), which fills part of the cross-sectional area ARC of the radial clearance. A remaining open bearing hole (not shown) receives the inner pipe 104. However, because the outer wall 110 of the inner pipe has a smaller diameter than an inner diameter of the bearing, a sludge flow hole 129 (FIGS. 1C, 4, 7, and 8) remains open between an inside of the bearing hole and the outside of the inner pipe 104. The flow hole 129 may also be referred to as a material collection opening or a sludge collection opening. A cross-sectional area ASF (FIG. 4) of the flow hole 129 may be described in terms of the area ARC minus the area AB of the bearing 122. For clarity of illustration, the area ASF is identified in each of FIGS. 7 and 8 by an area containing dots. The area ASF is described below with respect to FIGS. 4, 7, and 8, and represents the cross-sectional area through which the sludge (and material) may flow (see arrows 130) from outside the telescopic pipes 102 and 104 into the telescopic pipes 102 and 104. Thus, with the bearing 122 in the outer pipe 102, and the inner pipe 104 in the bearing 122, the area ASF remains, or is maintained, open for such sludge flow. For clarity of illustration, the bearing 122 is not shown in FIG. 1A.

The bearing 122 has dual properties, one of which is a bearing function that permits the walls 108 and 110 to slide relative to each other and for this purpose the bearing 122 may be configured from polymer. The bearing 122 is configured to be mounted surrounding the inner pipe 104. In one embodiment of the bearing 122, two C-shaped pieces 122-P (FIGS. 1B, and 4) are provided, each being made from the exemplary polymer. The C-shaped pieces 122-P are placed together to define a thick circle, or annular-shaped, or donut-shaped, configuration. A fastener 124 (FIGS. 1C and 4) such as a screw, extends through each of two holes 126 adjacent to an open end 128 of the outer pipe 102. The screws 124 extend through the holes 126 and into the respective C-shaped piece 122-P to retain the respective one of the C-shaped pieces 122-P adjacent to such end 128 and with the annular-shaped bearing 122 mounted surrounding the inner pipe 104 in the radial clearance. The bearing 122 is thus held in place in the radial clearance and the inner surface of the bearing 122 may slide on the outer surface of the inner pipe as the outer pipe (with the bearing) is moved for sludge collection. As described below with respect to FIGS. 7 and 8, a header 132 is mounted to the outer pipe 102 close to (e.g., within an exemplary six inches from) the open end 128 of the outer pipe 102. The bearing 122 held in place adjacent to the open end 128 is thereby also said to be adjacent to the header 132. Also, this header 132 is referred to as the "adjacent" header 132 to denote this closely-spaced axial relationship at the open end 128. In sequence then, there is the open end 128, then the adjacent bearing 122, and then the adjacent header 132, all closely spaced. It may also be understood from FIG. 1B, which for other purposes shows the open end 128 without the adjacent header 132, that the inner pipe 104 is received in the sludge flow hole 129 of the adjacent bearing 122 at the open end 128. Also, FIG. 1B shows a length of the inner pipe 104 extending beyond (to the right of) the open end 128. This extension of the inner pipe 104 gives rise to a problem as to how to assure that the above-described normal material collection traversing of the outer pipe 102 (here being to the right) occurs even though that length of the inner pipe 104 extends beyond the end 128. Such exemplary rightward traversing must not be impaired by sludge that, in the absence of the sludge collection opening 130, would build-up at the end 128 and that would build-up centrally (immediately around) that length of the inner pipe 104 that extends beyond the open end 128.

Figure 7:
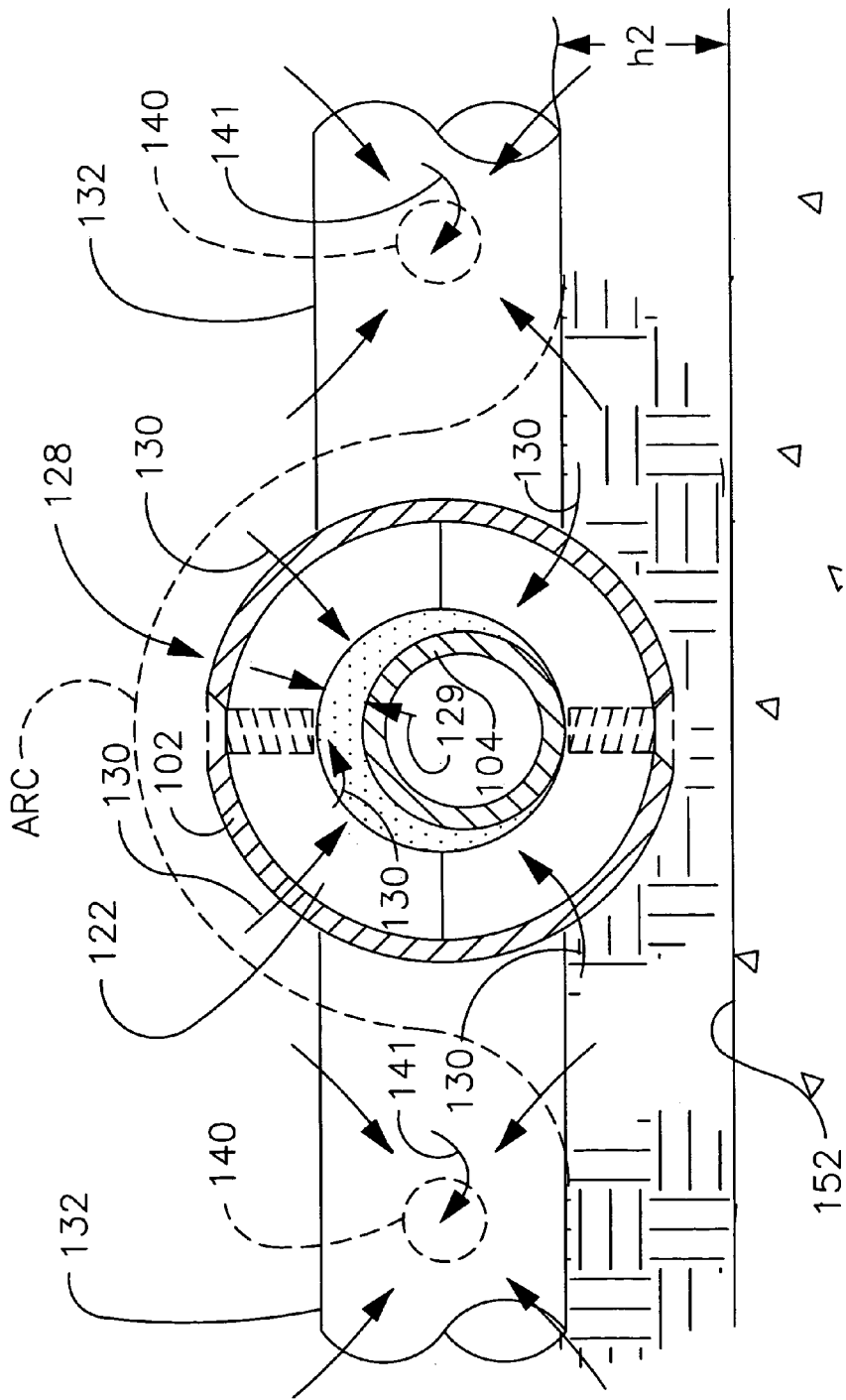
FIG. 7 is a sectional view taken on line 7—7 in FIG. 5 showing details of the bearing of the present invention inside a right open end of the outer pipe, illustrating the central sludge collection opening that allows the central axial flow having the value of not less than a minimum flow of the sludge into the right open end for collection.
Figure 8:
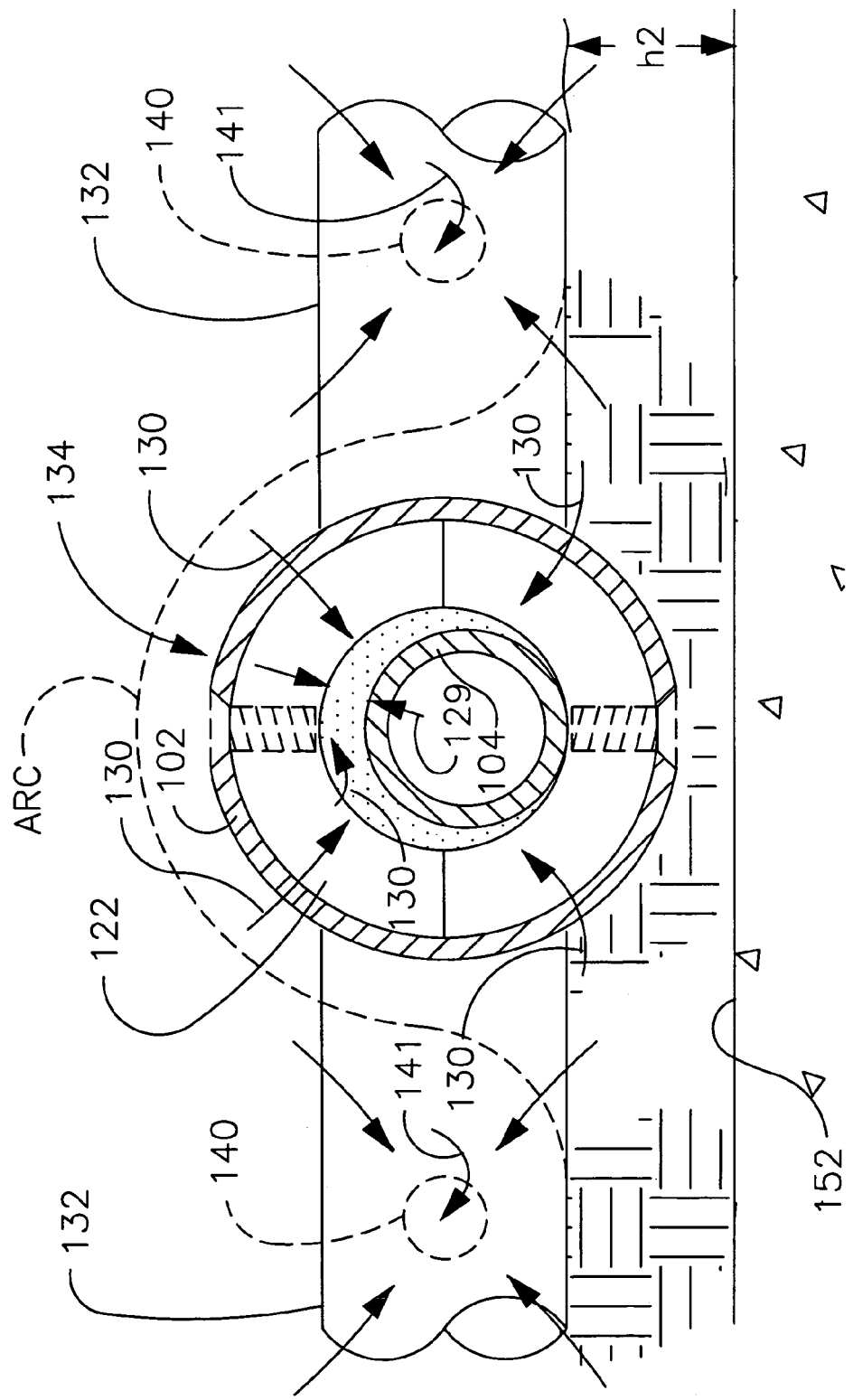
FIG. 8 is a sectional view taken on line 8—8 in FIG. 5 showing details of the bearing inside a left open end of the outer pipe, illustrating the central sludge collection opening that allows the central axial flow having a value of not less than the minimum flow of the sludge into the left open end for collection.

The second property of the bearing 122 relates to the material collection opening 129, and to the area ASF (see area identified by dots in FIGS. 4, 7 and 8). The area ASF is a portion of the radial clearance that remains open after the bearing 122 has been placed in the radial clearance between the respective outer and inner pipes 102 and 104, and adjacent to the open end 128. Based on the above description, it may be understood from FIGS. 1C and 4 that the annular, or donut, -shaped configuration of the bearing 122 provides an outer diameter of the flow hole (or material, or sludge, collection opening) 129 greater than the diameter of the outer wall 110 of the inner pipe 104 received in the bearing, to provide the open area ASF through which the sludge may flow into the radial clearance and then into the material collection conduit 120 (FIG. 1C) within the outer pipe 102. The bearing 122 is thus configured (FIG. 4) so that the material collection opening 129 is larger than and extends substantially around the outer wall 110 of the inner pipe 104. In this manner, as shown in FIGS. 4, 7, and 8, as the walls 108 and 110 slide relative to each other, the area ASF (dotted area) remains open around the outer wall 110 of the inner pipe 104. As described below, a value of this cross-sectional sludge flow area ASF is related to a value of a cross-sectional area AHO (not shown) of orifices, or inlets, 140 of the adjacent header 132.

Referring to FIG. 4, with this bearing configuration, and with the bearing 122 fixed to the outer pipe 102, in a preferred embodiment, during relative movement between the inner pipe 104 and outer pipe 102, the bearing 122 may support and rub against the outside wall 110 of the inner pipe 104 and perform the bearing function to facilitate such relative movement, which movement may be referred to as traversing of the outer pipe. With the pipes 102 and 104 operated at low pressure, the preferred embodiment of the bearing 122 also provides the second property, which is to allow the flow 130 of the material into the material collection conduit 120 (FIG. 1C) directly from the open end 128 of the outer pipe 102. The flow 130, which is also referred to as a "central axial flow", is in an axial direction of the pipes 102 and 104 and through the open cross-sectional area ASF (FIG. 4) defined by the material collection opening 129. The area ASF is adjacent to the axis of the pipes, such that the flow 130 is also "central" as described above. It may be appreciated that such central axial flow 130 enters the material collection conduit 120 (FIG. 1C) from "other than" the adjacent header 132 that is provided with the header openings 140. In a most preferred embodiment of the present invention, the configuration of the bearing 122 is such that the material collection opening 129 allows the flow 130 having a value of not less than a minimum flow MF of collected material. That flow 130 flows from the open end 128 of the outer pipe 102, and through the opening 129 (of the bearing 122) and through the radial clearance and through the material collection conduit 120 of the outer pipe 102 and through the inner pipe 104. The minimum flow MF is described in detail below with respect to FIGS. 7 and 8.

Figure 9:
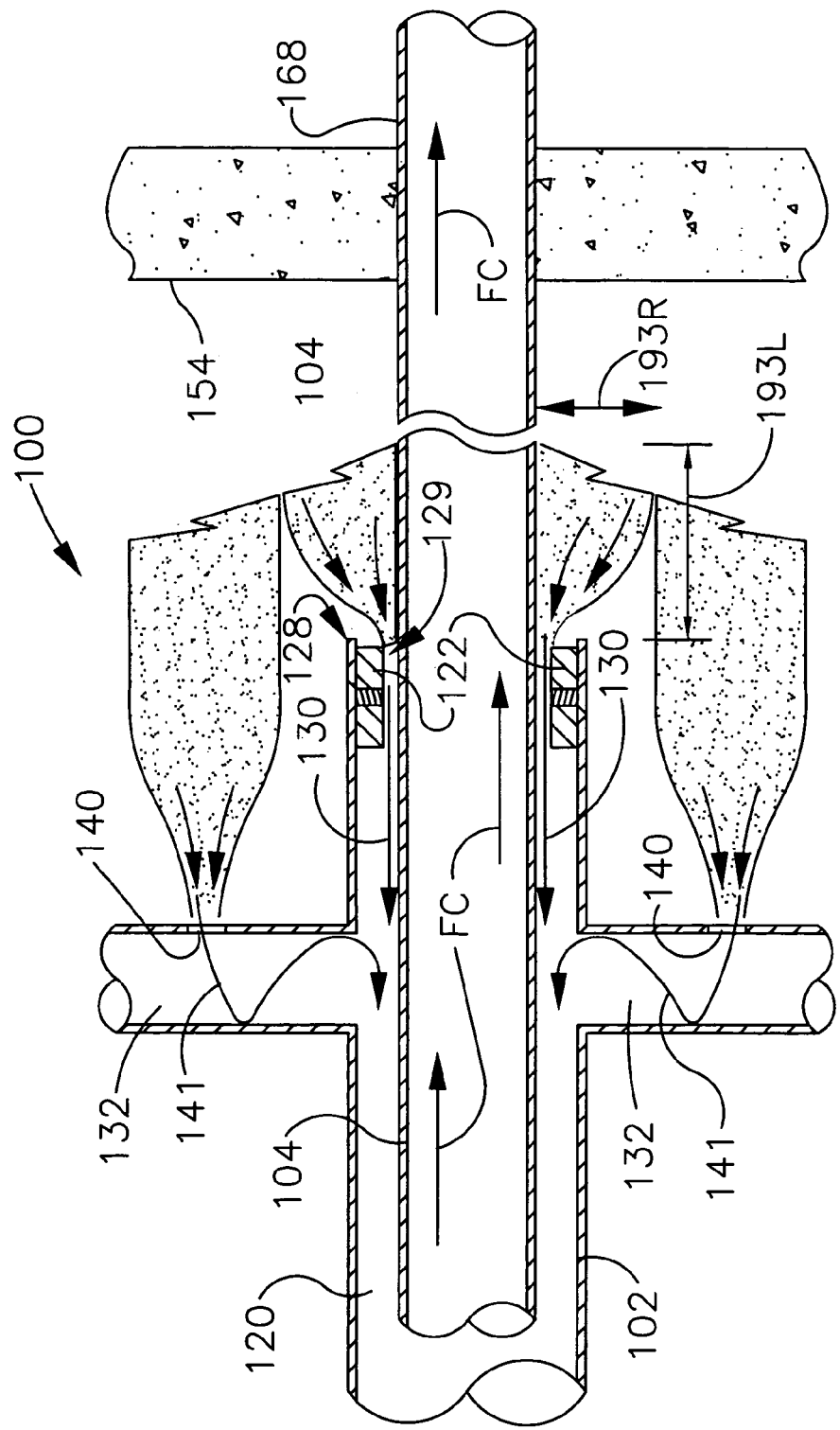
FIG. 9 is a plan view taken along line 9—9 in FIG. 5 showing sludge urged to flow from the basin from locations immediately around the inner and outer pipes into the open end of the outer pipe, wherein that flow has a value of not less than the minimum flow of collected sludge, so that the normal sludge collection movement of the outer pipe is not impaired by sludge that, in the absence of the central sludge collection opening, would build-up centrally immediately around the inner and outer pipes in the telescopic relationship.

The traversing of the outer pipe 102 facilitates similar traversing of one or more of the headers 132 that may be secured to the outer pipe 102. Each header 132 includes hollow members such as a pipe or conduit, each being in two sections, one section being secured to each opposite side of the outer pipe 102. Opposite ends of each header 132 are closed, and the end that is secured to the outer pipe 102 is open to permit the collected material and liquid to enter the outer pipe 102. The headers 132 are also provided with rollers 142 which guide the headers 132 and the pipes 102 and 104 as described below. FIG. 1A shows an end 134 of the outer pipe 102 that is closed to facilitate sludge flow through the headers 132 and sludge flow through the sludge collection opening 129. However, one or more headers 132 may be provided between one of the headers 132 that is near the left closed end 134 and another one of headers 132 (the adjacent header) that is adjacent to the open end 128 of the outer pipe 102. In this manner, a desired flow rate of material and liquid may be achieved. An exemplary plurality of headers 132 is shown in FIG. 1A as two headers, and each of the headers 132 may be configured according to U.S. Pat. No. 5,914,049. Such configuration includes the material and liquid inlet, or header, openings (or orifices) 140 that facilitate collection of the material, and of liquid with the material. In terms of these openings 140, as described above with respect to an adjacent header 132, the bearing 122 shown in FIGS. 1B and 1C is effective to allow the flow 130 having the value of at least the minimum flow MF of the sludge, (or material and liquid) through the sludge collection opening 129. Thus, for example, sludge flow 141 in the adjacent header 132 from the openings 140 is not the only sludge flow in the system 100. The sludge flow 130 and the sludge flow 141 combine in the inner pipe 104, for example, as the flow FC (FIGS. 1A, 1C, and 9).

To provide adequate flow FC of the collected materials and liquid, the headers 132 may be configured with various nominal (inside) diameters, which are selected according to the desired flow rate through the material collection conduit 120, and in particular the part C2 (FIG. 1A) of the inner pipe 104. One consideration in configuring the headers 132 is the distance from the header 132 to an inlet end 166 of the inner pipe 104. An exemplary distance from the left header 132 is shown in FIG. 1A shorter than an exemplary distance from the right (adjacent) header 132 (which is adjacent to the open end 128). For example, the inner pipe 104 may have a nominal diameter of about four inches and the outer pipe 102 a nominal diameter of about six inches, and the exemplary two headers 132 may be provided. Each header 132 may have a three inch nominal diameter. With suitably sized material and liquid collection openings 140 in the two headers 132, and with the area ASF (FIG. 4) of the sludge flow hole 129 suitably configured with respect to the openings 140 of the adjacent header, this configuration will provide a flow FC having a flow rate of up to about 320 gpm through the inner conduit 104. This example shows that the present invention may provide a substantially greater flow rate (i.e., about 320 gpm) of the flow FC through the inner pipe 104 using the same nominal (four inch) diameter of the inner pipe 104 as the maximum diameter four inch nominal diameter flexible prior art hose that has the maximum 200 gpm flow rate and more head loss.

Figure 2A:
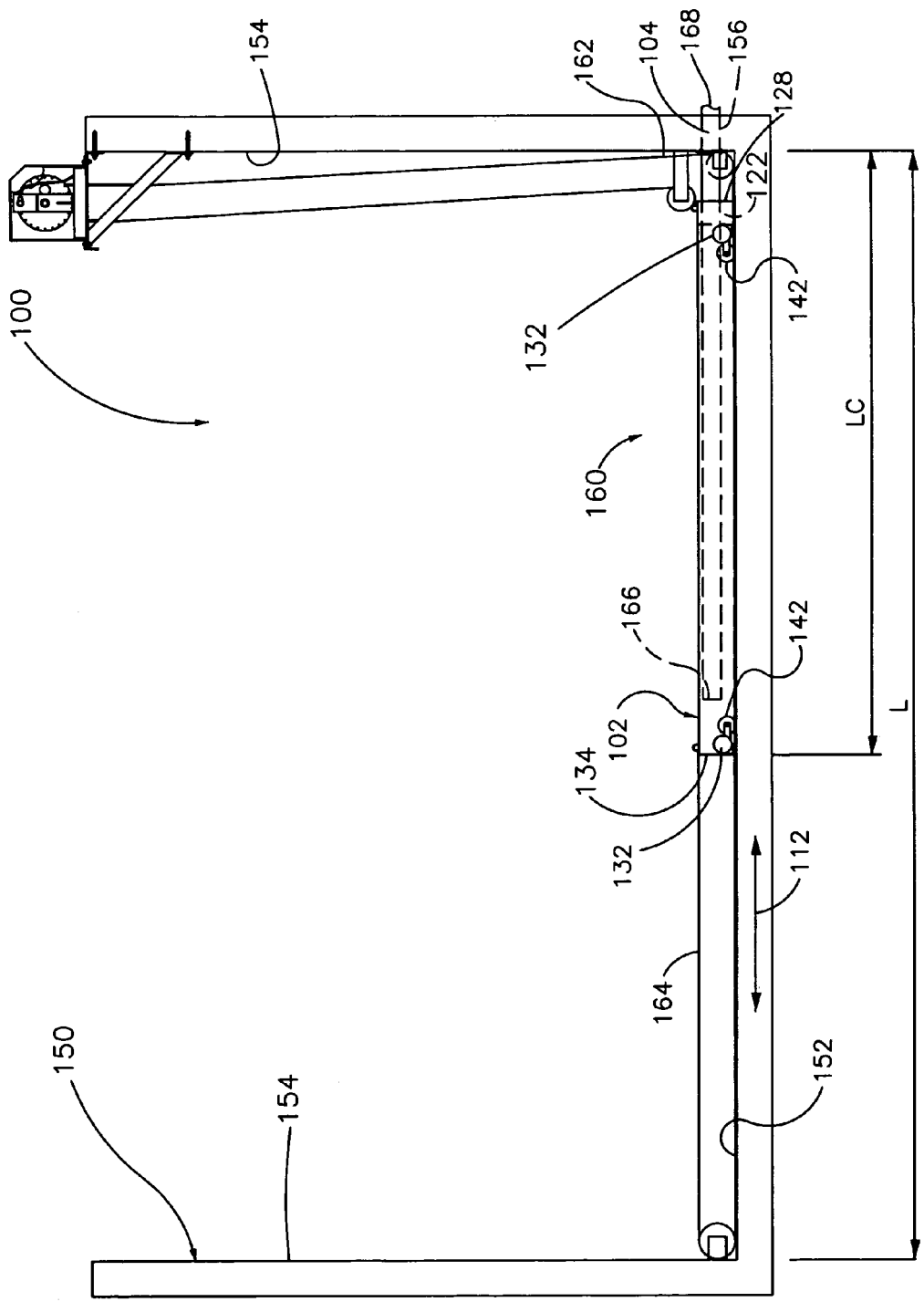
FIG. 2A is an elevational view showing the system installed in a container, which is typically referred to as a basin.

FIG. 2A shows one of the systems 100 installed in a container, which is typically referred to as a basin 150. Details not essential to the system 100 are not shown, but it may be understood that the liquid and materials enter the basin 150, and depending on the type of basin 150, the materials in some manner make their way to a floor, or bottom 152 of the basin 150. For clarity of description, the materials and liquid are not shown. When the materials accumulate on the bottom 152, the system 100 serves to collect them and guide them from the basin 150. The basin 150 is provided with opposite end walls 154. An end wall 154 on the exemplary right of the basin 150 is provided with an outlet hole 156 that receives the inner pipe 104 of the system 100. The inner pipe 104 is secured to the right wall 154, as by a coupler or fitting, such that the inner pipe 104 is fixed to the end wall 154. The hole 156 is adjacent to the bottom 152 so that the axial direction (arrow 112) extends close to, and parallel to, the bottom 152. The basin 150 is shown with a length L between the end walls 154. The length of the inner pipe 104 in the basin 150 has a value of about ½ L as shown in FIG. 2A, plus the exemplary overlap (e.g., four to six inches) described above. The system 100 is also shown with the outer pipe 102 in the above-described telescopic relationship with the inner pipe 104. Thus, the outer pipe 102 extends over the inner pipe 104. The rollers 142 shown in FIG. 1A engage the side walls (not shown) and bottom 152 of the basin, roll through the sludge, and keep the bottom of the outer pipe 102 an exemplary few inches above the bottom 152. The outer pipe 102 is shown with an exemplary two headers 132, and the headers 132 collectively extend across a width (not shown) between the side walls of the basin 150.

In FIG. 2A the outer header 102 is shown in the collapsed position, fully on (and almost entirely covering) the inner pipe 104, in contrast to the position shown in FIG. 1A. In this collapsed position, the rightward header 132 is located next to the right end wall 154 and the leftward header 132 is in the middle of the basin (between the end walls 154). A cable drive 160 is provided to move the outer pipe 102 in the above-described traversing movement relative to the inner pipe 104. The cable drive 160 may include a first cable 162 connected to the right open end 128 of the outer pipe 102, and a second cable 164 connected to the left end 134 of the outer pipe 102. The cables 162 and 164 are alternately moved left and right by a shared-reel drive described in U.S. Pat. No. 5,655,727, issued on Aug. 12, 1997, and entitled "Sludge Collector Method and Drive With Shared Reel For Taking Up And Paying Out Cables", the disclosure of which is incorporated by reference. The cable drive 160 moves the outer pipe 102 to the left from the collapsed position shown in FIG. 2A to the extended position shown in FIG. 2B. The rollers 142 again roll over the floor 152 and against the side walls, and the headers 132 move through and into the sludge that is on the floor 152.

Figure 2B:
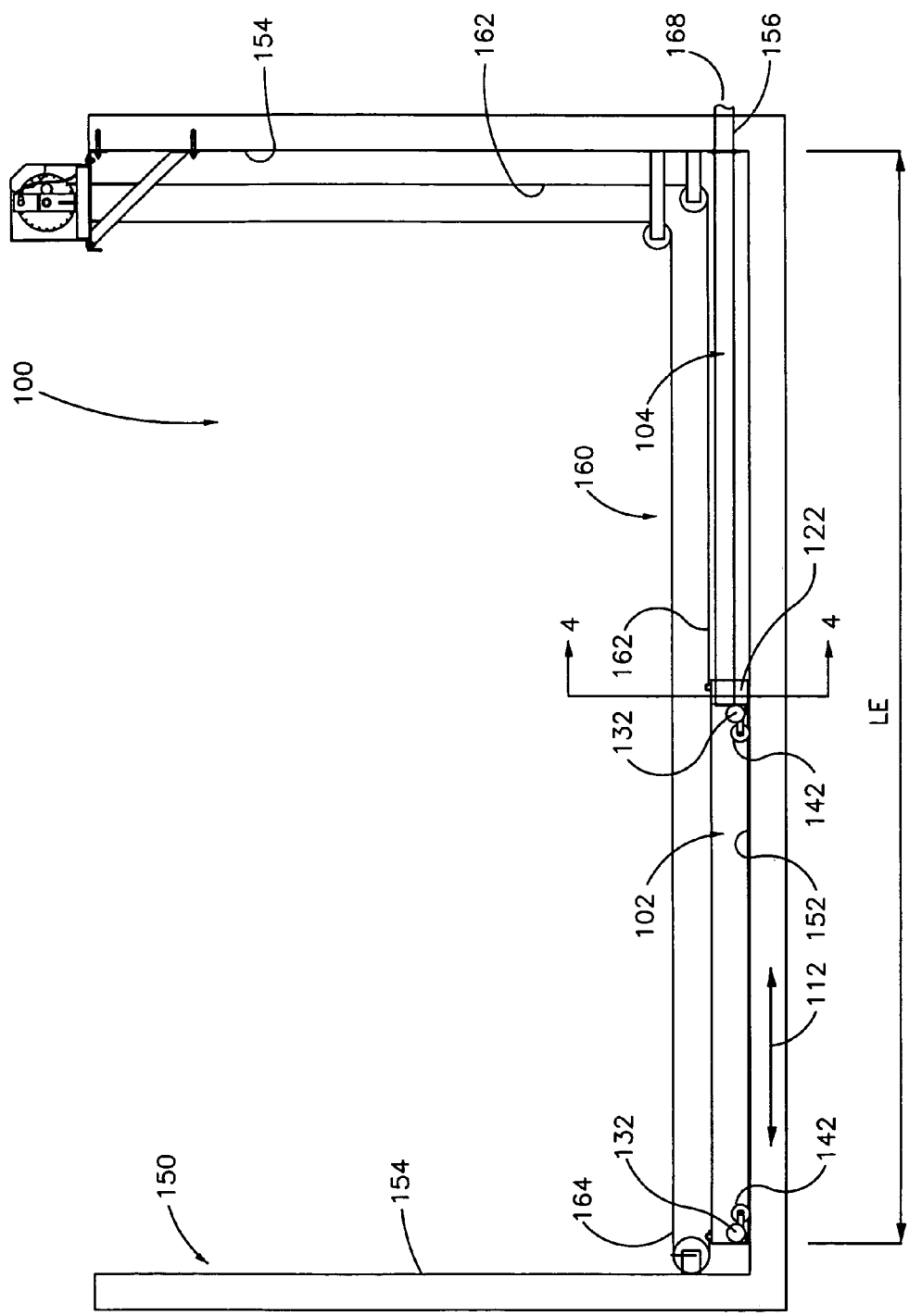
FIG. 2B is an elevational view showing an extended position of the inner and outer pipes in a telescopic relationship.

An outlet end 168 of the inner pipe 104 extends through the end wall 154 (e.g., the rightward end wall 154 in FIG. 2B). The outlet end 168 of the inner pipe 104 extends outside the basin 150. The outlet end 168 is connected to a valve and vacuum pump (not shown). The pump causes a low pressure (less than atmospheric pressure) to be applied to the outlet end 168 of the inner pipe 104. That low pressure causes a low pressure in the material collection conduit 120 defined by the pipes 102 and 104. For example, the low pressure in the conduit 120 causes the two sludge collection flows 130 and 141 described above. First, as a result of the low pressure in the conduit 120 the sludge is caused to flow into the openings 140 in the adjacent header 132 as the outer pipe 102 is traversed. The sludge flow 141 enters and flows through the outer pipe 102. The low pressure in the conduit 120 also causes the other flow 130. Thus, as a result of the low pressure in the conduit 120, and as a result of the cross-sectional area ASF remaining open around the outer wall 110 of the inner pipe 104, in a most preferred embodiment of the present invention, the configuration of the bearing 122 is such that the material collection opening 129 allows the flow 130 having a value not less than the minimum flow MF. The flow 130 is through the open end 128 of the outer pipe 104 and past the bearing 122 and past the adjacent header 132 into and through the radial clearance into the outer pipe 104. The flow 130 combines with the flows 141 as the combined flow FC, which flows beyond a point at which the pipes no longer overlap (i.e., into the outer pipe 102 and then into the inlet end 166 of the inner pipe 104).

Figure 3A:
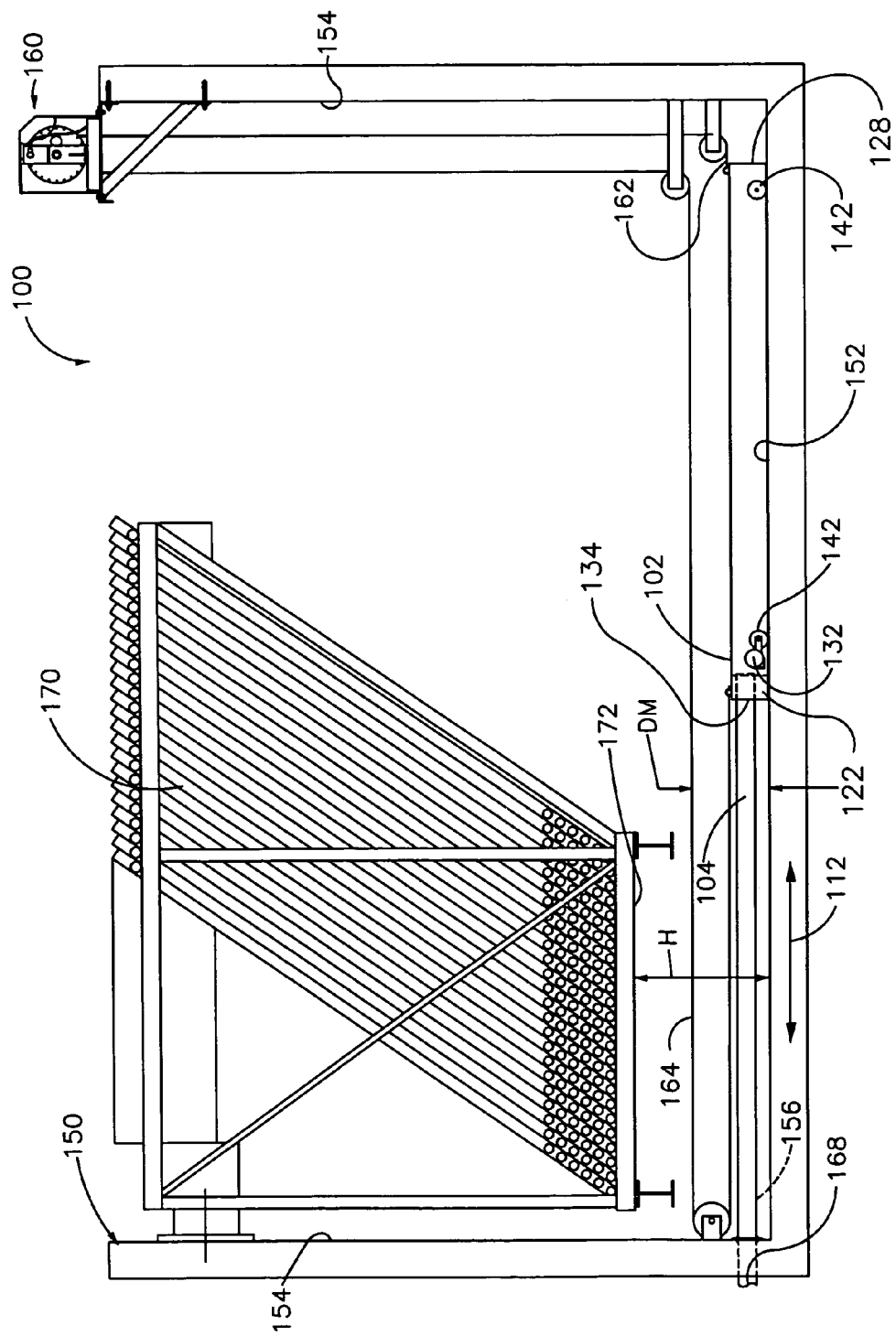
FIG. 3A is an elevational view showing a collapsed position of the inner and outer pipes in the telescopic relationship under settler equipment.

FIG. 3A shows another embodiment of the system 100 in which one header 132 is provided on the outer pipe 102. The open end 134 of the outer pipe 102 is provided with the bearing 122 as described above with respect to FIGS. 1B, 1C, and 4 so that the sludge collection opening 129 is provided with the open area ASF. Also, an exemplary item of equipment 170 is shown in a leftward section of the basin 150. The equipment 170 is configured in the above-described position relative to the bottom 152 of the basin 150 to provide a low-clearance height H between the bottom 152 and a lower portion or bottom 172 of the equipment 170. For example, the low-clearance height H may be between the floor 152 of the basin 150 and a bottom (not shown) of a stirring facility of a flocculator, or between the floor 152 of the basin 150 and the bottom of the plates of a plate settler. This clearance H may be about two feet and is a source of the above-described problems with the prior flexible hoses, which problem is solved by the system 100. The low profile of the maximum vertical dimension DM of the system 100 easily fits within the low-clearance height H, because the height of the low-profile dimension DM designates the value less than the low-clearance height H described above. In more detail, because the two pipes 102 and 104 are in the telescopic relationship, the two pipes 102 and 104 and the cable drive 160 occupy less height than two separate (non-coaxial) pipes would occupy, and the telescopic pipes 102 and 104 do not float above the bottom 152 of the basin 150. Moreover, the positions of the cables 162 and 164 in FIGS. 2B, 3A and 3B are exemplary for clarity of illustration, whereas in practice the cable 162 and 164 may actually run as shown in FIG. 2A in the sludge at the bottom 152 of the basin 150 (and thus take up less vertical dimension DM).

In FIG. 3A the outer pipe 102 is shown in the extended position, with the right end 128 closed. The inner pipe 104 is shown extending through and fixed to the left end wall 154 of the basin 150. Thus, the outer pipe 102 is almost fully off the inner pipe 104. In this extended position, the one exemplary adjacent header 132 is in the center of the basin and the outer pipe 102 is not under the bottom 172 of the equipment 170. The cable drive 160 is shown with the first cable 162 connected to the right end of the outer pipe 102, and the second cable 164 connected to the left end of the outer pipe 102. The cables 162 and 164 are operated in the same manner as described above to traverse the outer pipe 102.

Figure 3B:
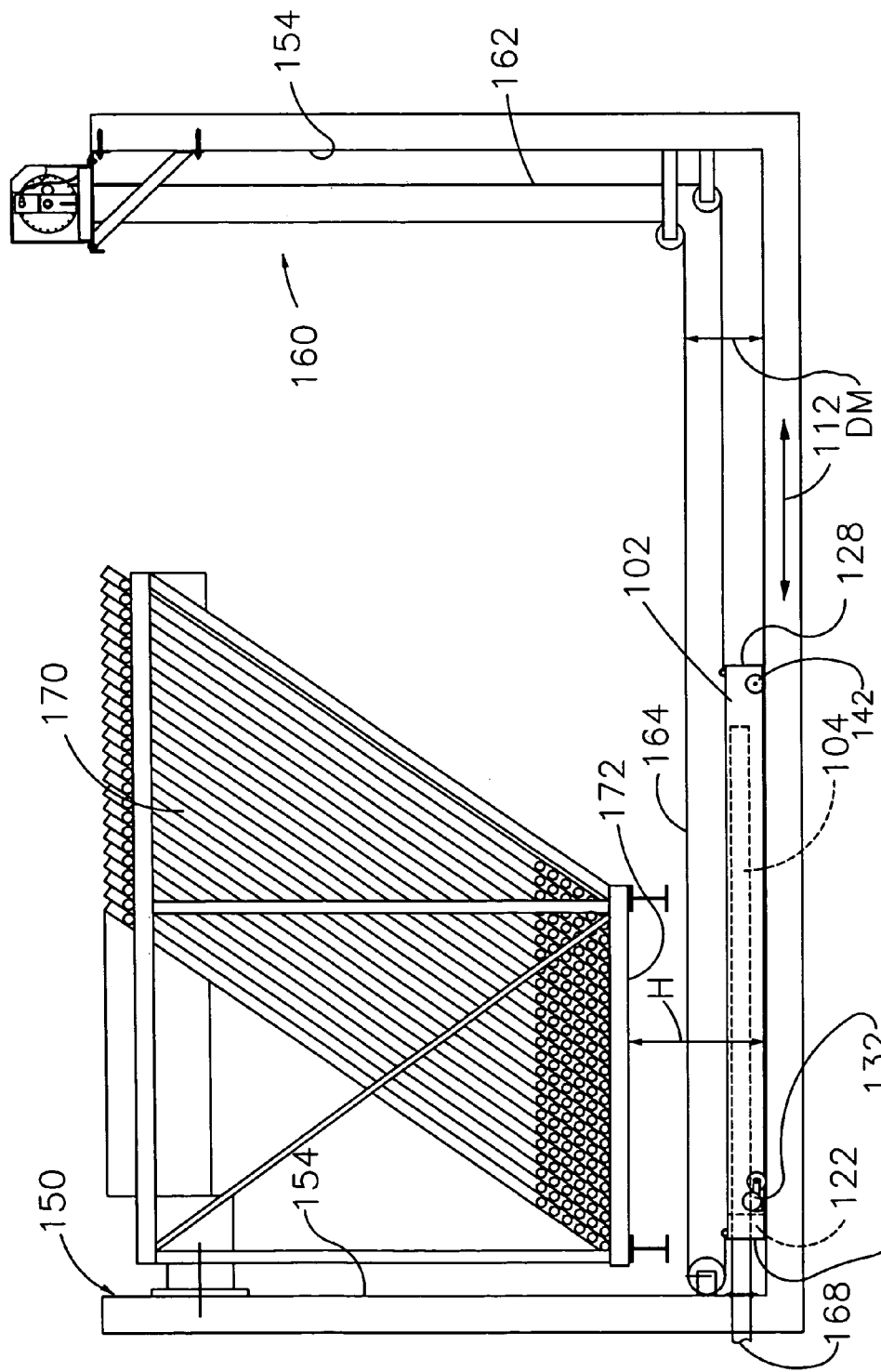
FIG. 3B is an elevational view showing a cable drive for moving the outer pipe in exemplary movement to an extended position.

FIG. 3B shows that the cable drive 160 moves the outer pipe 102 to the left from the extended position shown in FIG. 3A to the collapsed position shown in FIG. 3B. Again, the rollers 142 roll over the floor 152 and side walls (not shown). As the outer pipe 102 is returned to the collapsed position from the extended position of FIG. 3A, the adjacent header 132 and the open end 134 of the outer pipe 102 move into the sludge that is on and above the floor 152. FIG. 3B shows the outlet end 168 of the inner pipe 104 extending outside of the basin 150 (past the left end wall 154), and the connections to the pump are the same as described above. As the adjacent header 132 moves to the left into the sludge, the low pressure in the conduit 120 causes the two sludge collection flows 130 and 141 described above. First, the sludge and liquid flow through the openings 140 of the adjacent header 132 and flow as the described flow 141 through the adjacent header 132 and then enter and flow through the radial clearance. Second, because of the configuration of the bearing 122, the material collection opening 129 allows the flow 130 having the value of not less than the minimum flow MF of collected material to flow through the open end 134 of the outer pipe 104 and past the bearing 122 and into the radial clearance to combine with the flow 141. The combined flow FC flows into the outer pipe 104 beyond a point at which the pipes no longer overlap and then into the inner pipe 104. When the outer pipe 102 reaches the left end 154 of the basin 150, the cable drive 160 reverses and the outer pipe 102 then traverses to the right and back to the fully extended position shown in FIG. 3A. The reversing and opposite traversal alternate through many cycles of collecting the material. It may be appreciated that with only the one exemplary header 132 as shown in FIGS. 3A and 3B, the header 132 of the system 100 only collects (or removes) the sludge from the portion of the basin 150 under the equipment 170, and the flow 130 into the open end 134 is also from the portion of the basin 150 that is under the equipment 170. Such exemplary leftward traversing must not be impaired by sludge that, in the absence of the sludge collection opening 130, would build-up at the end 134 and that would build-up centrally (immediately around) that length of the inner pipe 104 that extends beyond the open end 134. The sludge collection opening 129 serves to prevent such impaired traversing.

FIG. 4 shows details of the fastener 124 that secures the bearing 122 to the outer pipe 102. Also shown is the inner pipe 104 supported on the bearing 122, which in turn is supported and carried by the outer pipe 102. Further shown is the configuration of the material collection opening 129 when the bearing 122 supports the inner pipe 104. It may be understood that with only one bearing 122 provided between the two pipes 102 and 104, the outer pipe 102 is free to move between the fully extended position and the collapsed position. Also, because of the annular configuration of the bearing 122, even with the inner pipe 104 supported by the bearing 122 and rendering the material collection opening 129 eccentric, the area ASF of the material collection opening 129 allows the central axial flow 130 having the value of not less than the minimum flow MF to flow through the open end 128 of the outer pipe 104 and axially and centrally past the bearing 122 and through the radial clearance into the outer pipe 104 beyond the point at which the pipes no longer overlap.

Figure 5:
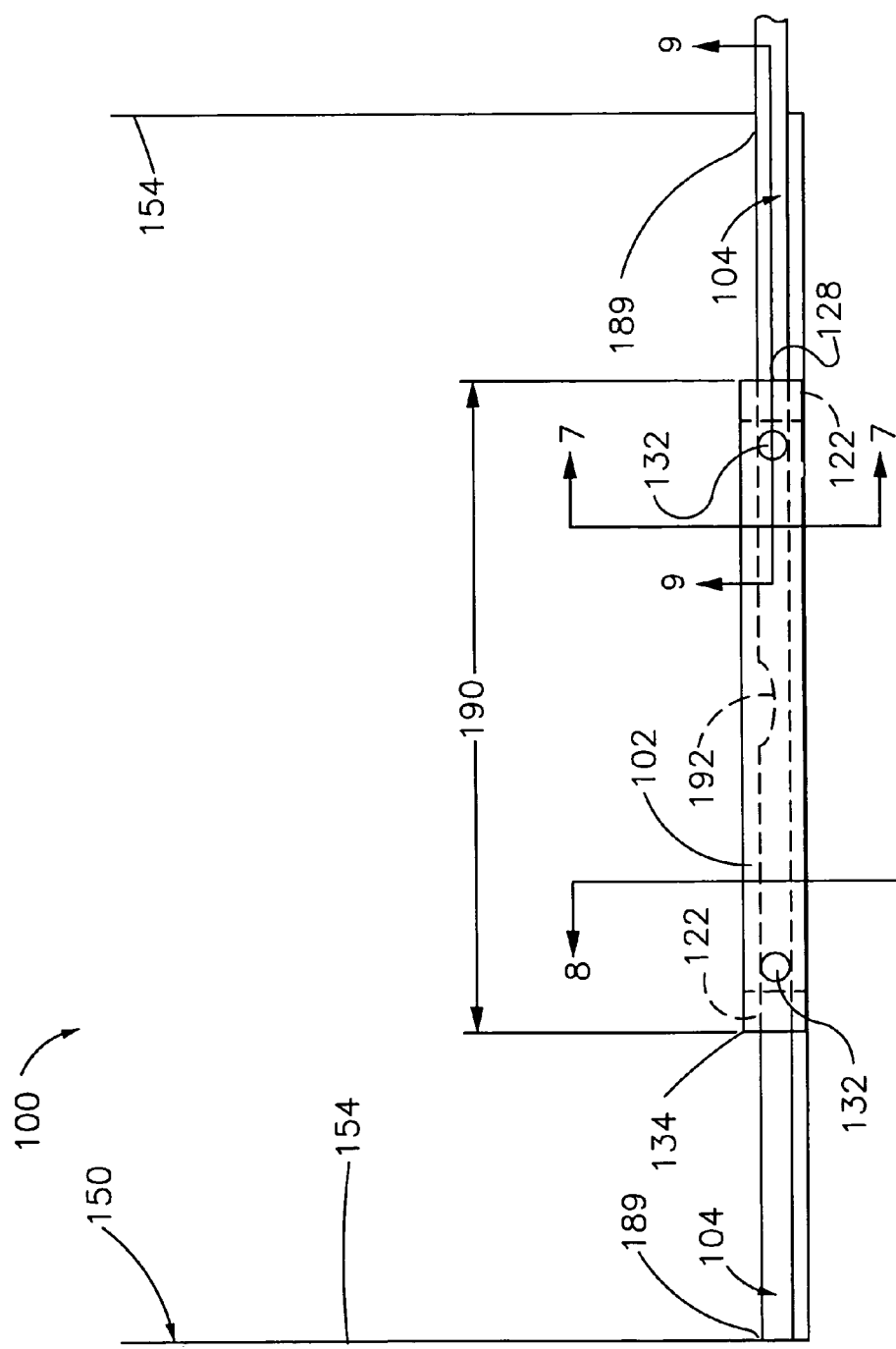
FIG. 5 is a view similar to FIG. 2A in which the basin is configured with opposed end walls, and the inner pipe is configured to be supported adjacent to each of the end walls and is provided with an opening through which to receive the material from the outer pipe.

FIG. 5 shows another embodiment of the system 100 also configured to be used in the basin 150 having the spaced opposite end walls 154. The walls 154 may be referred to as first and second end walls 154. The first end wall 154 is shown on the left of FIG. 5 and the second end wall 154 is shown on the right. The inner rigid pipe 104 is configured to extend from the first (left) end wall 154 to the second (right) end wall 154. The inner pipe 104 is configured with opposite ends 189 that are supported adjacent to each of the end walls 154, as by being secured to each wall 154, as shown in FIG. 5, or being supported by a mount (not shown) that is on the bottom 152 adjacent to each of the end walls 154. The outer pipe 102 may be configured to extend in the telescopic relationship with respect to the inner pipe 102 along a distance 190 that is greater than half of the length L of the basin 150 between the end walls 154. The inner pipe 104 may also be configured with a second sludge collection opening 192 located between the ends 189. The second sludge collection opening 192 is provided through which to receive the sludge from the outer pipe 102 under the action of the low pressure applied to the inner pipe 104. The respective outer and inner pipes 102 and 104 are configured so that in the telescopic relationship the outer pipe 102 has the opposite ends 128 and 134. Also, the outer pipe 102 is always outside and coaxial with at least a portion of the inner pipe 104, wherein the portion is about equal to the distance 190. Further, the inner pipe 104 extends to the left and right of that portion of the inner pipe 104. Thus, a length of the inner pipe 104 extends beyond the end 128, and a length of the inner pipe 104 extends beyond the end 134. At each such end 128 and 134, the respective length gives rise to the problem as to how to assure the above-described normal sludge collection traversing of the outer pipe 102. Such traversing must not be impaired by sludge that, in the absence of the respective sludge collection opening 130, would build-up at the respective end 128 or 134, and build-up centrally (immediately around) those lengths of the inner pipe 104 that extend beyond the respective ends 128 and 134. To solve that problem in the FIG. 5 embodiment, the bearing 122 is provided at each of the opposite ends 128 and 134 of the outer pipe 102 as described below with respect to FIGS. 7 and 8, and a header 132 (an above-described "adjacent" header) is provided adjacent to each bearing 122 at the respective ends 128 and 134. The bearings 122 provide the above-described dual functions. The sludge is received by the outer pipe 102 from both of the adjacent headers 132 (as the flows 141). The sludge is also received from the sludge collection opening 129 of each of the bearings 122 (as the flows 130). The combined flow FC is through the radial clearance that is on each side of the second sludge collection opening 192 and into that second sludge collection opening 192 for flow to the right through the inner pipe 104 and out of the basin 150 as described above. In this embodiment, the outer pipe 102 is configured with the length 190 that exceeds half of a length L of the basin 150 between the opposed end walls 154. This length 190 assures that the second opening 192 in the inner pipe 104 is always covered by the outer pipe 102. Also, the left adjacent header 132 (located adjacent to the left end 134 of the first pipe 102) need only traverse substantially less than the length L of the basin 150 because the right adjacent header 132 (located at the right end 128 of the first pipe 102) will also collect sludge from the bottom 152 as the left adjacent header 132 collects the sludge. Further, each sludge collection opening 129 of the respective adjacent bearing 122 will collect the sludge centrally and around the respective length of the inner pipe 104 that extends out of the outer pipe 102. This configuration shown in FIG. 5 thus includes the adjacent bearing 122 provided at each end 128 and 134, and each of these ends 128 and 134 open and maintained open by the respective adjacent bearing 122 that provides the central axial sludge collection opening 129. As a result, the sludge flow 130 through each of the sludge collection openings 129 has a value of not less than the minimum flow MF. Each such flow 130 is sufficient to collect sludge centrally and in enough quantity that the normal sludge collection traversing of the outer pipe 102 is not impaired by sludge that, in the absence of the respective sludge collection opening 130, would build-up at the respective end 128 or 134, and build-up centrally, i.e., immediately around the pipes that are in the telescopic relationship.

It may be understood that the FIG. 5 embodiment of the system 100 is especially suited to basins 150 having a very long length L, which may be up to about 200 or more feet. With the opposite ends 189 of the outer pipe 104 secured in a fixed manner adjacent to the end walls 154 of the basin 150, and with closure of the end 189 that does not extend through the right end wall 154, the inner pipe 102 in effect rides along and is guided by the outer pipe 104 in the axial direction 112 (FIG. 1A) and throughout the distance of the traverse of the outer pipe 102. In such traverse, and as described below with respect to FIG. 9, at least one adjacent header 132 passes over each laterally outer (i.e., non-central) location of the bottom 152 of the basin 150 and collects the sludge with liquid away from the telescopic pipes 102 and 104. Also, each of the sludge flows 130 (each having the value of not less than the minimum flow MF) is sufficient to collect the sludge axially and centrally in enough quantity that the normal sludge collection traversing of the outer pipe is not impaired at either end 128 or 134. The flows 141 of the sludge and liquid through the adjacent headers 132, and such central axial flows 130 through the sludge collection openings 129, again combine as the above-described flow FC to be guided out of the basin 150.

Figure 6:
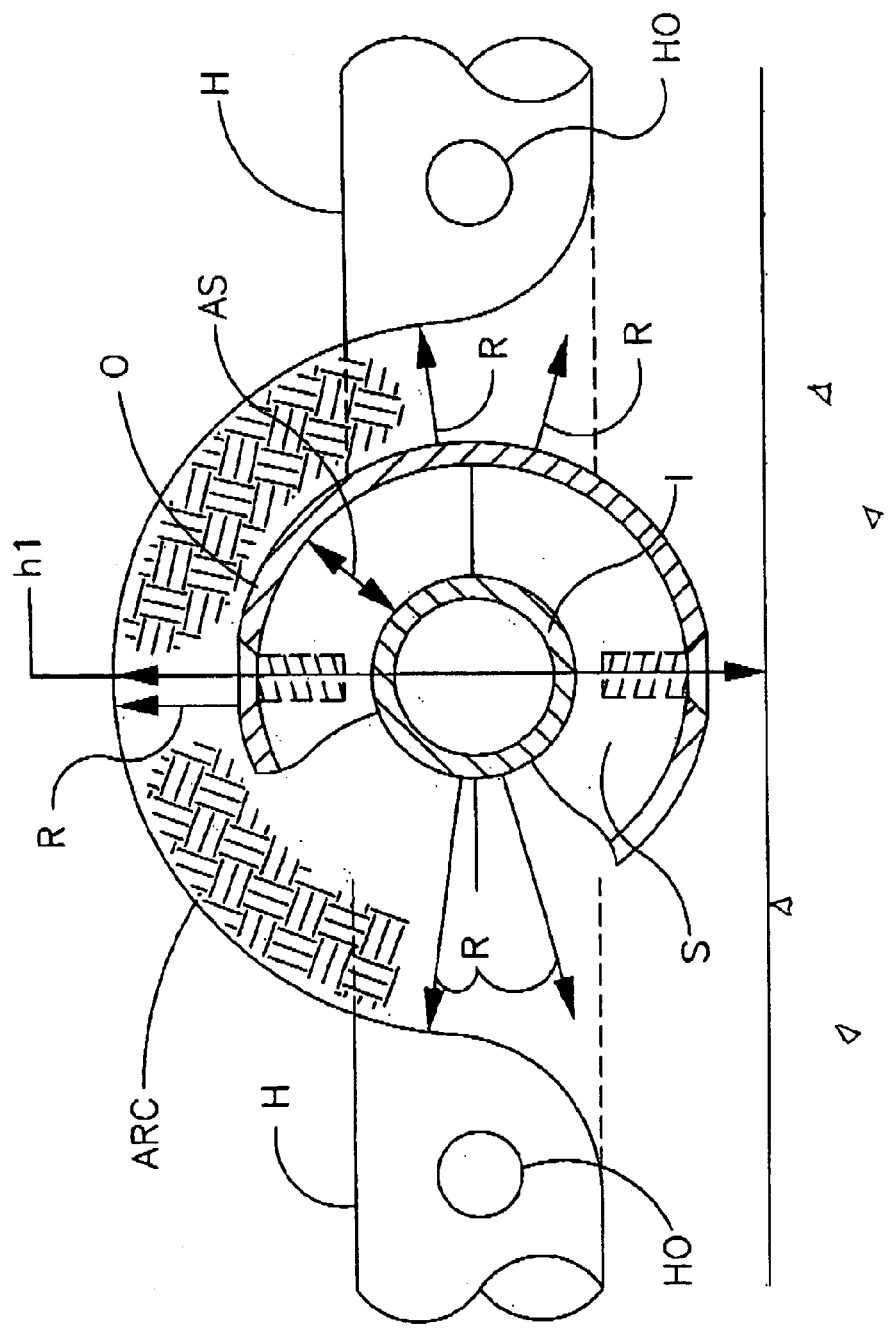
FIG. 6 is a cross-sectional view showing the above-described prior telescopic conduit arrangement in which a difference in diameter between an inner conduit and an outer conduit is increased to provide, on a sealing means that tightly seals the inner conduit to the outer conduit, a sealed area that is subjected to differential pressure to drive a sludge take-up system across a floor of a basin.

FIG. 6 is a cross-sectional view showing the above-described prior telescopic conduit arrangement in which a difference in diameter between an inner conduit I and an outer conduit O is increased to provide, on a sealing means S that tightly seals the inner conduit I to the outer conduit O, a sealed area AS that is subjected to differential pressure to drive a sludge take-up system (not shown) across a floor of a basin. It may be understood that the tight sealing by the sealing means S and the sealed area AS are in direct contrast to the bearing 122 of the present invention, which (opposite to the tight sealing means S) includes the sludge collection opening 129 that allows the central flow 130 to have a value of at least the minimum flow MF. FIG. 6 shows exemplary sludge that has accumulated, or built-up, when the sealing means S is used. The illustrated build-up is characterized by sludge accumulation in a cross-sectional area ABU (not shown). The accumulation in the area ABU occurs not only on the bottom of a basin and extends upwardly from the bottom, but is shown extending radially outwardly (see arrows R) from the circumference of the inner pipe I and from the circumference of the outer pipe O. This build-up area ABU is thus laterally of and also above and below the longitudinal axis of the inner conduit I and outer conduits O. This area ABU is referred to as an area "immediately around" those conduits I and O, and may extend as much as about six inches radially outwardly of the conduits I and O. The outer boundary of the area ABU is identified by an arc ARC in FIG. 6. Thus, the sludge build-up area ABU is shown in FIG. 6 as immediately surrounding the axially extending inner conduit I and has a height shown as h1. This area ABU immediately around the conduits I and O is also used to identify a volume that is "immediately around" the conduits I and O. Such volume is obtained by multiplying that area ABU by a length ABUL (not shown) in front of the sealing means S in the direction in which the outer conduit O is moved for sludge collection.

Returning to the description of the present invention, FIG. 7 shows details of the bearing 122 inside the right end 128, which is an open end of the outer pipe 102. FIG. 8 shows details of the bearing 122 inside the left end 134, which in this embodiment is an open end of the outer pipe 102. Each such bearing 122 is an "adjacent" bearing as described above. The details of each bearing 122 include the sludge collection opening 129 that also allows the central flow 130 to have a value of at least the minimum flow MF. This central flow 130 is shown in each of FIGS. 7 and 8 as being into the exemplary respective right and left open ends 128 and 134 (FIG. 5) for collection. Each such bearing 122 provides the cross-sectional area ASF (identified by a dotted area), which represents the area through which the sludge (and material) may flow (in the central flow 130) from outside the pipes 102 and 104, through the respective open ends 128 (right) and 134 (left), through the sludge collection openings 129, and into the telescopic pipes 102 and 104. Such flow 130 is in contrast to the sludge in the built-up area ABU immediately around the conduits shown in FIG. 6 when the bearing 122 and opening 129 are not used. In contrast to the sludge in the area ABU, the result of the flow 130 of sludge into the openings 129 is shown in FIGS. 7 and 8 as substantially reducing the amount of sludge above the bottom 152.

In more detail, as described above, because each sludge flow 130 has a value of not less than the minimum flow MF, each flow 130 is illustrated in FIGS. 7 and 8 as being sufficient to collect the sludge centrally, i.e., from immediately around the pipes 102 and 104 in the telescopic relationship (i.e., from the sludge build-up area ABU). The central flow 130 is thus shown as being sufficient to collect material in enough quantity that the normal material collection traversing of the outer pipe is not impaired. This quantity is illustrated by the flow 130 having reduced the sludge depth from the exemplary height h1 (FIG. 6) to the exemplary height h2 (FIGS. 7 and 8), which is generally about the height of the lower side of the adjacent header 132. The sludge at depth h2 has been removed from immediately around the inner pipe 104. The sludge is also shown having been removed radially inward from the outer boundary ARC of the area ABU (see dashed line ARC) to the inner pipe 104. As a result, in the normal material collection traversing of the outer pipe 102, more than one-half (for example) of the cross-sectional area of the outer pipe 102 may be free of the sludge, and thus such free area does not face the sludge during the traversing, and the normal traversing is not impaired.

Stated another way, as the traversing outer pipe 102 moves to the left (as shown in FIG. 5), the left end 134 of the outer pipe 102 does not merely push, or plow, into the sludge that is ahead of the left end 134 and around the inner pipe 104. Rather, the left end 134 advances into that sludge and the sludge collection opening 129 receives, and thus collects, that sludge from in front of the left end 134, and from locations within area ARC that are lateral (or radial) of the outer pipe 102. A similar result occurs as the traversing outer pipe 102 moves to the right in FIG. 5 and the sludge collection opening 130 at the right end 128 collects the sludge that is in front of the right end 128, and from locations within the area ARC that are lateral (or radial) of the outer pipe 102. In this manner, an amount of sludge that is pushed axially by the respective open ends 128 and 134 is greatly reduced, and is reduced to such an extent that over time, the sludge that may have initially been in the sludge build-up area ABU (as at system start-up) immediately around the inner pipe 104 has, over many traverses, been removed, or collected, as shown by height h2 in FIGS. 7 and 8. Thus, by the operation of the openings 129 in collecting this sludge from the build-up area ABU immediately around the inner pipe 102, the normal material collection traversing of the outer pipe is not impaired.

In one sense, each of the bearings 122 is configured in cross-section to be larger than the cross-section of the outer wall 110 of the inner pipe 104, and thus provide the material collection opening 129. In this manner, as the walls 108 and 110 slide relative to each other, and as the open ends 128 and 134 move into the sludge, the cross-sectional area ASF remains open around substantially all of the outer wall 110 of the inner pipe 104 and is available for sludge collection via the central flow 130. In another sense, the cross-sectional configuration of each bearing 122 is such that with the inner pipe 104 received in the bearing 122, the material collection opening 129 allows the central flow 130 to be not less than the minimum flow MF.

Referring to FIG. 9, the results of the central flow 130 having a value of not less than the minimum flow MF is shown in plan view. FIG. 9 shows the sludge collection system 100 with the sludge urged in the central axial flow 130 from immediately around the inner pipe 104. As an example of the central flow 130 with respect to each of the bearings 122, the flow into one open end 128 of the outer pipe 102 is shown. The effect of the central flow 130 may also be described with respect to a lateral, or radial, distance 193R perpendicular to the axial direction of traverse. This distance 193R is also referred to as a central collection distance that extends on each side of the inner pipe 102. The central flow 130 having a value not less than the minimum flow MF is sufficient to collect sludge from an area of the bottom of the basin. The area is defined by a minimum value 193RM of the central collection distance 193R on each side of the pipes 102 and 104, and value 193RM is multiplied by a collection length 193L. The minimum value 193RM is that value necessary to remove the material from immediately around the pipes 102 and 104 so as to avoid impairing the traversing of the outer pipe 102 and the headers 132 that may be carried and traversed by the outer pipe 102. In practice, with material or sludge having usual characteristics of density, etc., the sludge and material should be removed from the distance 193R having at least a (minimum) distance 193RM of about four inches from the outside of the inner pipe 104. This removed sludge and material is in the sludge build-up area ABU, and may be referred to as "central" sludge and material.

In a preferred embodiment of the present invention, the cross-sectional area ASF of each of the central openings 129 is related to a cross-sectional area AHO of each orifice 140 that is provided on the headers 132. Such cross-sectional area AHU is generally perpendicular to the flow 141 into the openings 140. For ease of description, that cross-sectional area AHO of one such orifice 140 may be said to have a value of one "area unit". One header 132 may have a number "N" of orifices 140, such that the total cross-sectional area of the orifices 140 of that header 132 is N times the one area unit, referred to as the total cross-sectional area "NAHO". In this preferred embodiment of the present invention, the cross-sectional area ASF is substantially less than the area NAHO. With this area ASF substantially less than the area NAHO, the central flow 130 has a value of no less than the minimum flow MF and is effective to collect sludge from no less than the minimum central collection distance 193R on each side of each pipe 102 and 104. Collection of sludge from this minimum distance 193RM removes the sludge from the sludge build-up area ABU immediately around the pipes 102 and 104 (as described above) so as to avoid impairing the traversing of the outer pipe 102 and the headers 132 that may be carried and traversed by the outer pipe 102.

In more preferred embodiment of the present invention, the cross-sectional area ASF of a particular one of the central openings 129 is also related, or proportional, to the total cross-sectional area NAHO of all of the orifices 140 of the respective adjacent header 132 that is connected to the outer pipe 102 adjacent to the particular open end 128 or 134. The area ASF has a value of about two area units. The area ASF is related to a sum of such total area NAHO plus the area ASF, by an area ratio (ASF/ASF+NAHO) of about 0.125.

In a most preferred embodiment of the present invention, the cross-sectional area ASF of each of the central openings 129 is also related to the total cross-sectional area NAHO of all of the orifices 140 of the respective adjacent header 132 that is connected to the outer pipe 102 adjacent to the particular open end 128 or 134. In this most preferred embodiment, one adjacent bearing 122 is used and one open end 128 is provided, and the adjacent header 132 has about fourteen orifices 140, each with a value of one "area unit". These fourteen orifices 140 are spread out laterally along the entire length of the adjacent header 132 across both sides of the pipe 102 (see FIG. 1A). The proportionality, or relation, is provided in that the area ASF is provided with a value of about two area units. The two area units result from appropriately configuring the bearing 122, and the central material collection opening 129, in the manner described above. As a result, the cross-sectional area ASF is about two area units, the total cross-sectional area NAHO is about fourteen area units, and the area ratio (ASF/ASF+NAHO) is 2/16, or 0.125.

Figure 10:
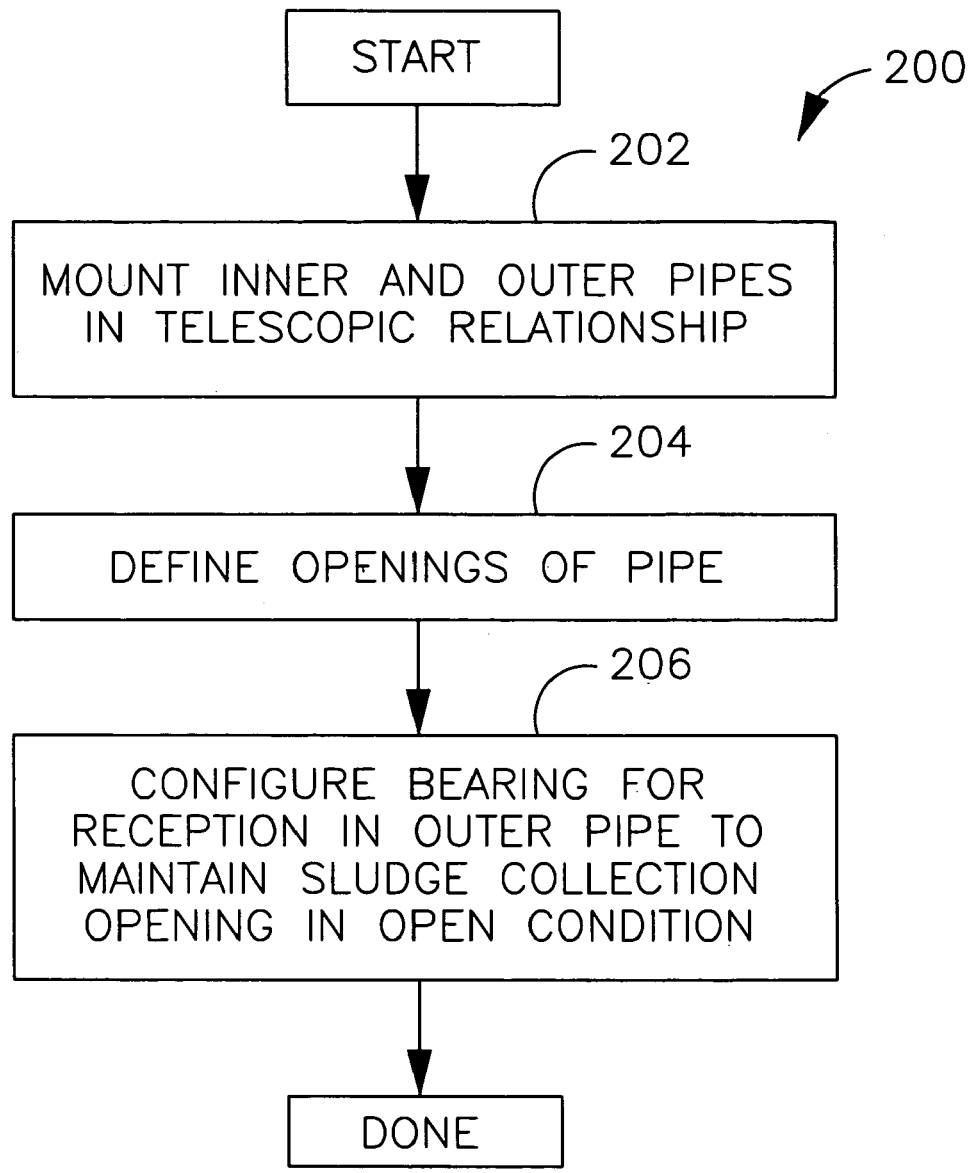
FIGS. 10 and 11 are flow charts illustrating operations of methods of the present invention.

In another preferred embodiment of the present invention, a method is provided for collecting the material or sludge from the bottom 152 of a settling volume, such as a bottom of a settling basin. The method may include operations of a flow chart 200 shown in FIG. 10, and moves from start to an operation 202. Operation 202 mounts inner and outer rigid pipes 104 and 102 in the described telescopic relationship. The inner pipe 104 is received within the outer pipe 102 in the overlapping relationship so that the pipes 102 and 104 cooperate to define the sludge collection conduit 120 adjacent to the bottom 152 of the settling volume, e.g., next to the bottom 152 of the basin shown in FIG. 2A. The method moves to an operation 204 of defining openings in the pipes 102 and 104. This includes defining a first opening, e.g., 166 or 192, in the inner pipe 104, the first opening being received inside the outer pipe 102. The first opening may be the inlet end 166 (FIG. 1A) or the opening 192 (FIG. 5). This also includes defining an outlet end of the inner pipe 104, which end may be the end 189 (FIG. 5), and defining at least one open end at one end of the outer pipe. Such end may be one open end 128 (FIG. 1C), or the open end 132, or both ends 128 and 134. The method moves to operation 206 of configuring the bearing 122 that is received in the outer pipe 104 to maintain the sludge collection conduit 120 in an open condition. This maintaining open corresponds to providing the bearing 122, with the inner pipe 104 received in the bearing, with the material collection opening 129 by which a portion of the radial clearance between the pipes 102 and 104 remains open. The radial clearance also remains open from the one open end 128 of the outer pipe 104 to the first opening (166 or 192) of the inner pipe 102. As described above, the configuring operation 206 allows sludge collection movement (e.g., the traversing of) of the outer pipe 102 relative to the inner pipe 104. The sludge collection movement is into the sludge that is on the bottom 152 of the volume and immediately around the inner pipe 104. The configuring operation further allows the sludge collection flow 130 through the bearing opening 129 to have a value of not less than the minimum flow MF. As described above, the minimum flow MF is sufficient to collect the sludge from immediately around the pipes 102 and 104 so that the above-described normal material collection movement of the traversing outer pipe 102 is impaired by sludge that, in the absence of the sludge collection opening 130, would build-up at the end 128 and that would build-up centrally (immediately around) that length of the inner pipe 104 that extends beyond the open end 128. The method is done with such flow 130 having been provided.

Figure 11:
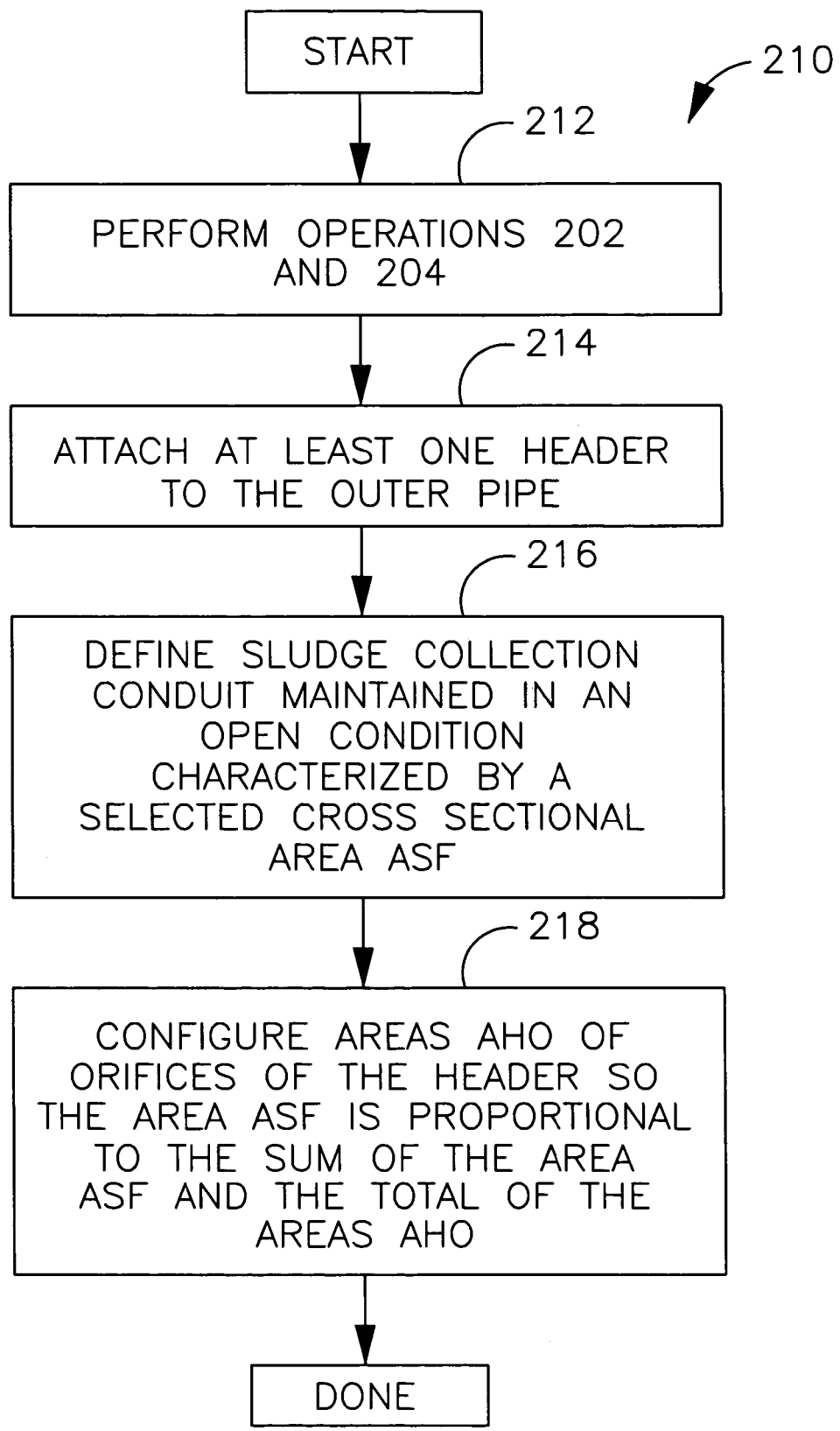

In one preferred embodiment of the present invention, the method may include operations described with respect to a flow chart 210 shown in FIG. 11. The method moves from start to an operation 212 which may perform operations 202 and 204. The method moves to an operation 214 of attaching an adjacent header 132 to the outer pipe 104 adjacent to the open end, e.g., 128, as described above. The adjacent header 132 may have a plurality of sludge inlet orifices 140 for collecting sludge from the bottom of the volume away from a volume that is immediately around the pipe 104. This volume may be defined, for example, by the lateral distance 193R times the axial distance 193L times the height h1 (FIG. 6). The method moves to an operation 216 of defining the sludge collection conduit 120 maintained in the open condition (by operation 206, FIG. 10) and is characterized by a selected cross-sectional area. The selected area is referred to above as the area ASF and may have the area units described above (e.g., about 2 area units). The method moves to an operation 218 of configuring areas of the orifices 140 of the adjacent header 132 so that a total cross-sectional area NAHO of all of the orifices 140 of that adjacent header 132 provides an area ratio (ASF/ASF+NAHO) of 2/16, or 0.125.

The preferred embodiment of the present invention may continue by applying a lower-than atmospheric pressure to the outlet end 189 of the inner pipe 104. This applying urges the sludge to flow into the system 100. A first aspect of this flow is into the orifices 140 of the adjacent header 132. Such flow is shown in FIGS. 8 and 9 as being in many directions, including from the bottom of the volume (e.g., defined by the basin), and is away from the sludge build-up area SBU (that is immediately around the pipes 102 and 104), and appears in the adjacent header 132 as the flow 141. A second aspect of this urged flow resulting from the applying further urges the sludge in the above-described flow 130 to flow, first from the sludge build-up area SBU that is immediately around the inner and outer pipes, and second, from the length 193L (FIG. 9). The flow 130 is shown going into the exemplary open end 128 of the outer pipe 102. If both ends 128 and 134 are open, the flow 130 is into each axial sludge opening 129 at the respective end 128 and 134. The flow 130 continues through the sludge collection conduit 120, which is in the open condition because of the bearing 122 configured with the opening 129. The flow 130 has a value of not less than the minimum flow MF, so that the normal material collection movement of the outer pipe is not impaired by sludge that, in the absence of the sludge collection opening 130, would build-up at the end 128 and that would build-up centrally (immediately around) that length of the inner pipe 104 that extends beyond the open end 128. The flows 130 and 141 combine to form the flow FC as described above.

The area SBU is shown in FIG. 9 extending by distance 193R on each side of the pipes 102 and 104. Also, in practice, the actual radial extent of the central collection distance 193R may exceed the minimum central collection distance 193RM, and may have a value of up to about six inches.

It may be understood, then that the system 100 of the present invention meets all of the above-described needs by providing a way of significantly increasing the flow rate that collects the material and liquid without causing the above-described problems in priming the sludge collection system 100. The way of significantly increasing the flow rate that collects the material and the liquid from the bottom 152 is by using the telescopic pipes 102 and 104, which define a larger-diameter pipe assembly connected to the headers 132 than the prior flexible hoses. The way of achieving these features, while still allowing the sludge collecting system 100 to traverse the headers 132 from one end wall 154 of the basin 150 to the opposite end wall 154 of the basin 150, while avoiding the above-described "impairing" of normal material collection movement of the pipes 102 and 104, is by configuring the bearing 122 to provide the material collection opening 129, and with that bearing adjacent to the adjacent header 132. The resulting material collection 129 opening allows the flow 130 having a value not less than the described minimum flow MF. This flow 130 is the flow into the sludge collection system 100 from immediately around the two material collection pipes 102 and 104 configured in the telescopic relationship. The way the present invention configures the material collection opening 129 to avoid such "impairing", is by configuring that adjacent bearing 122 between the two pipes 102 and 104 to allow the flow 130 to be directly into the two material collection pipes 102 and 104, i.e., without flowing through the orifices 140 of the headers 132. That adjacent bearing 122 allows such flow 130 having the value not less than the minimum flow MF, whereby the flow 130 is collected from the described locations near and immediately around the two pipes 102 and 104 (i.e., from the sludge build-up area SBU, so that sludge will not build-up and will not interfere with the normal traverse of the outer pipe 104 that carries the adjacent header 132.

The minimum flow MF was described above in terms of an example in which two headers 132 were used on the outer pipe 102. The minimum flow MF results, for example, when the adjacent header 132 has about fourteen orifices 140, and each has the cross-sectional area AHO having a value of about one area unit. The exemplary cross-sectional area ASF for each adjacent bearing 122 is a value of about two area units. The area ratio of the area ASF (about two area units) to the total of area ASF plus area NAHO (fourteen eight area units) was about two area units to about sixteen area units, which is about 0.125, and provided the flow 130 having a value of not less than the minimum flow MF.

In other aspects of the present invention, the drive for the sludge collecting system 100 is thus separated from the flow 130 of collected sludge (as by providing the low-profile cable drive 160), and the outer and inner pipes 102 and 104 are not sealed to each other, but instead the bearing configuration promotes the collection of the sludge through the material collection opening 129 and allows collection of the sludge from the sludge build-up area SBU, which includes locations near and immediately around the longitudinal axis of the sludge collecting system 100 so that sludge will not build-up near such axis.

Although the foregoing has been described in some detail for purposes of clarity or understanding, it will be appreciated that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A system for collecting material from a bottom of a material settling container, comprising:
   a first rigid pipe, the first rigid pipe having a first opening;
   a second rigid pipe, the second rigid pipe having a first open end;
   the first and second pipes being in telescopic relationship with one pipe received within the other pipe in an overlapping relationship so that the first and second pipes cooperate to define a material collection conduit, wherein a first portion of the material collection conduit extends axially between the first opening and the first open end, the first portion being configured to define a radial clearance between the first pipe and the second pipe and to extend axially between the first opening and the first open end; and
   a bearing received in the radial clearance between the first pipe and the second pipe and located axially between the first opening and the first open end, the bearing being configured in cross-section to cooperate with the inner pipe to define a material collection opening, the cross-sectional configuration of the bearing being such that with the inner pipe received in the bearing the material collection opening allows a flow of collected material having a value not less than a minimum flow to flow centrally and axially through the radial clearance from the first open end of the second rigid pipe to the first opening of the first pipe.

2. A system for collecting material as recited in claim 1, wherein:
   the minimum flow is sufficient to collect material from immediately around the pipes in the telescopic relationship so that normal material collection movement of the second pipe is not impaired.

3. A system for collecting material as recited in claim 2, the system
   further comprising:
   a header connected to the second pipe and provided with first plurality of openings through which to receive material from across a lateral width of the material settling container; and
   wherein the bearing is configured so that with the first pipe received in the bearing a first area of the material collection opening has a value of about two area units, and a second area that comprises the total of individual areas of all of the first plurality of openings of the header has a value of about fourteen area units, and the first area is related to the second area by an area ratio of about 2 to 16 to allow the flow to be sufficient to collect material from immediately around the pipes in the telescopic relationship so that normal material collection movement of the second pipe is not impaired.

4. A system for collecting material as recited in claim 1, the system further comprising:
   a first header secured to the second pipe adjacent to the first bearing, the first header having a first plurality of openings through which to collect the material, the header defining a header conduit extending from the first plurality of openings to the material collection conduit;
   wherein a first area of the material collection opening is proportional to a second area, the second area comprises a total of individual areas of all of the first plurality of openings in the header, and
   wherein the first area is proportional to the second area according to an area ratio comprising a numerator equal to the first area and a denominator comprising the sum of the first area and the second area.

5. A system for collecting material as recited in claim 4, wherein:
   the area ratio is about 0.125.

6. A system for collecting material as recited in claim 4, wherein:
   the second pipe further comprises a second open end;
   the first opening is received in the second pipe spaced from the first open end and spaced from the second open end; and
   the first pipe extends outside of the second pipe so that a first portion of the first pipe is adjacent to and outside of the first open end and a second section of the second pipe is adjacent to the second open end;
   the header is a first header and the bearing is a first bearing;
   the system further comprising:
      a second of the two headers, each of first and second headers having about fourteen openings through which to collect the material, the first header being secured to the second rigid pipe adjacent to the first open end and adjacent to the first section, the second header being secured to the second rigid pipe adjacent to the second open end and adjacent to the second section; and
      a second of the two bearings, the second bearing being received in the radial clearance between the first pipe and the second pipe and located axially between the first opening and the second open end, the second bearing being configured in cross-section to cooperate with the first pipe to define a second material collection opening;
      wherein the cross-sectional configuration of each bearing is such that with the first pipe received in the first bearing and in the second bearing, each of the first and second material collection openings allows a flow of collected material having a value of not less than the minimum flow to flow centrally and axially through the radial clearance into the second pipe; and
      wherein the cross-sectional configuration of each of the bearings is such that with the first pipe received in the first bearing and in the second bearing each of the first and second material collection openings has a first cross-sectional area that provides an area ratio of about 0.125 with respect to the sum of the first area and a total of the cross-sectional areas of the fourteen openings of the header that is adjacent to the respective bearing.

7. A system for collecting material as recited in claim 4, wherein:
   each of the openings of the first plurality of openings has an area having a value of about one area unit and the total area of the first plurality of openings is about fourteen area units; and
   the material collection opening is configured to have a cross-sectional area having a value of about two area units.

8. A system for collecting material as recited in claim 1, wherein:
   the configuration of the bearing is such that the material collection opening is co-extensive with part of the first portion of the material collection conduit; and
   the minimum flow is sufficient to collect material outside the first pipe and outside the second pipe, the collection being from immediately around the inner pipe so that normal material collection movement of the second pipe is not impaired by material that, in the absence of the material collection opening, would build-up centrally relative to the pipes.

9. A system for collecting material as recited in claim 1, wherein:
   the second pipe is configured with a second open end; and
   the first opening is a second open end, the second open end being received in the second rigid pipe axially spaced between the first open end and the second open end.

10. A system for collecting material as recited in claim 1, wherein:
    the second pipe further comprises a second open end;
    the first opening is received in the second pipe spaced from the first open end and from the second open end;
    the bearing comprises a first bearing received in the radial clearance between the first pipe and the second pipe and axially received between the first opening and the first open end, the first bearing being configured to cooperate with the first pipe received in the first bearing to define a first one of the material collection openings located axially between the first opening of the first rigid pipe and the first open end of the second pipe, the first material collection opening allowing the flow to be a first flow having a value of no less than the minimum flow to flow through the first material collection opening; and
    the bearing comprises a second bearing received in the radial clearance between the first pipe and the second pipe and axially received between the first opening and the second open end, the second bearing being configured to cooperate with the first pipe received in the first bearing to define a second one of the material collection openings located axially between the first opening and the second open end of the second, the second material collection opening allowing a second flow having a value of no less than the minimum flow to flow through the second material collection opening.

11. A system for collecting material as recited in claim 10, the system further comprising:
    a first header secured to the second pipe adjacent to the first bearing, the first header having a first plurality of openings through which to collect the material, the first header defining a first header conduit extending from the first plurality of openings to the material collection conduit;

a second header secured to the second pipe adjacent to the second bearing, the second header having a first plurality of openings through which to collect the material, the second header defining a second header conduit extending from the first plurality of openings to the material collection conduit;

wherein a first area of each of the material collection openings is proportional to a second area, the second area comprises a total of individual areas of all of the first plurality of openings of each of the headers, and wherein each of the first areas is proportional to each of the second areas according to an area ratio comprising a numerator equal to the first area and a denominator comprising the sum of the first area and the second area.

12. A system for collecting material as recited in claim 11, wherein:

each of the area ratios is about 0.125.

13. A system for collecting sludge from a bottom of a basin on which the sludge settles, comprising:

an inner rigid pipe, the inner pipe having a first opening;

an outer rigid pipe, the outer pipe having an open end;

the inner and outer pipes being in telescopic relationship to define a sludge collection conduit, wherein a first portion of the sludge collection conduit extends axially between the first opening and the open end, the first portion being configured as a sludge passageway extending radially between the inner pipe and the outer pipe and axially between the first opening and the first open end;

a header secured to the outer pipe adjacent to the open end, the header having a first plurality openings through which to collect the sludge from across a lateral width of the basin except from axial locations adjacent to the inner and outer pipes in the telescopic relationship, the header defining a header conduit extending from the first plurality of openings to the sludge collection conduit; and a bearing received in the sludge passageway radially between the inner pipe and the outer pipe and axially between the first opening and the open end, the bearing promoting normal sludge collection movement of the outer pipe relative to the inner pipe even though sludge tends to collect immediately around the inner pipe, the bearing being configured to cooperate with the inner pipe to define a sludge collection opening located axially between the first opening of the inner pipe and open end, the sludge collection opening allowing a flow of collected sludge from the open end and through the sludge passageway to the first pipe;

wherein the flow has a value of not less than a minimum flow of collected sludge through the sludge collection opening to the sludge passageway of the sludge collection conduit, and wherein the minimum flow is sufficient to collect enough sludge from the locations immediately around the inner pipe so that the normal sludge collection movement of the outer pipe is not impaired notwithstanding the tendency of the sludge to build-up around the inner pipe.

14. A system for collecting sludge as recited in claim 13, wherein:

a first area of the sludge collection opening is related to a second area and the second area comprises a total of individual areas of all of the first plurality of openings, wherein the first area is related to the second area by an area ratio, the area ratio being a ratio of the first area to the sum of the first area and the second area, the area ratio being about 2 to 16.

15. A system for collecting sludge as recited in claim 13, wherein:

the outer pipe includes a second open end;

the first opening of the inner pipe is spaced axially from the first open end and the second open end; and the bearing comprises a first bearing received in the sludge passageway radially between the inner pipe and the outer pipe and axially between the opening and the first open end, the first bearing being configured to receive the inner pipe and define a first one of the sludge collection openings axially between the first opening and the first open end, the first sludge collection opening allowing a first flow of collected sludge through the sludge passageway; and the bearing comprises a second bearing received in the annular sludge passageway radially between the inner pipe and the outer pipe and axially between the first opening and the second open end, the second bearing being configured to receive the inner pipe and define a second one of the sludge collection openings axially between the first opening and the second open end, the second sludge collection opening allowing a second flow of collected sludge through the passageway; and wherein the configuration of the first and second bearings is such that each of the respective first and second sludge collection openings allows a flow having a value of not less than the minimum flow of collected sludge flow through the respective sludge passageway.

16. A system for collecting sludge as recited in claim 13, wherein:

a header opening area comprises a total of the individual areas of all of the first plurality of openings in the header;

a first area of the material collection opening is proportional to the header opening area and the first area is proportional to the header opening area according to an area ratio comprising a numerator equal to the first area and a denominator comprising the sum of the first area and the header opening area.

17. A system for collecting sludge as recited in claim 16, wherein the area ratio is about 0.125.

18. A method of collecting sludge from a settling volume, the method comprising the operations of:

mounting inner and outer rigid pipes in a telescopic relationship, the inner pipe being received within the outer pipe in an overlapping relationship so that the pipes cooperate to define a sludge collection conduit adjacent to a bottom of the settling volume, defining a first opening in the inner pipe, the first opening being received inside the outer pipe;

defining an outlet end of the inner pipe;

defining an open end of the outer pipe; and configuring a bearing for reception in the outer pipe so as to maintain the sludge collection conduit in an open condition at a location axially spaced from the open end and from the first opening, the configuring operation facilitating sludge collection movement of the outer pipe relative to the inner pipe, the sludge collection movement being into the sludge on the bottom of the settling volume, the configuring operation allowing a sludge flow having a value of not less than a minimum flow of collected sludge to flow through the sludge collection conduit in an open condition.

19. A method as recited in claim 18, wherein:
the configuring operation configures the bearing and the inner pipe so that the minimum flow is sufficient to collect the sludge from immediately around the inner pipe so that normal sludge collection movement of the outer pipe is not impaired by sludge build-up immediately around the inner pipe.

20. A method as recited in claim 18, the method further comprising the operations of:
attaching a header to the outer pipe, the header having a plurality of sludge inlet orifices for collecting sludge from the bottom of the volume and away from a volume immediately around the inner pipe;
defining the sludge collection conduit maintained in the open condition as having a selected area; and
configuring areas of the orifices so that a ratio of the selected area to a sum of the selected area and a total area of the orifices is in a ratio of about 2 to 16.

21. A method as recited in claim 18, further comprising the operation of:
applying a lower-than atmospheric pressure to the outlet end of the inner pipe, the applying operation urging the sludge to flow into the plurality of sludge inlet orifices from the volume and away from immediately around the inner pipe, the applying operation further urging the sludge to flow from the bottom and from the volume immediately around the inner pipe into the open end, the sludge being further urged to flow through the sludge collection conduit that is in the open condition.

* * * * *